US008688139B2

(12) United States Patent
Garin et al.

(10) Patent No.: US 8,688,139 B2
(45) Date of Patent: Apr. 1, 2014

(54) CONCURRENT WIRELESS TRANSMITTER MAPPING AND MOBILE STATION POSITIONING

(75) Inventors: Lionel J. Garin, Palo Alto, CA (US); Ju-Yong Do, Palo Alto, CA (US); Gengsheng Zhang, Cupertino, CA (US)

(73) Assignee: QUALCOMM Incorporated, San Diego, CA (US)

( * ) Notice: Subject to any disclaimer, the term of this patent is extended or adjusted under 35 U.S.C. 154(b) by 345 days.

(21) Appl. No.: 12/876,970

(22) Filed: Sep. 7, 2010

(65) Prior Publication Data

US 2011/0059752 A1 Mar. 10, 2011

Related U.S. Application Data

(60) Provisional application No. 61/241,353, filed on Sep. 10, 2009.

(51) Int. Cl.
*H04W 24/00* (2009.01)
(52) U.S. Cl.
USPC ........................................ 455/456.1; 370/338
(58) Field of Classification Search
USPC ........................................ 455/456.1; 370/338
See application file for complete search history.

(56) References Cited

U.S. PATENT DOCUMENTS

| 6,185,429 | B1 | 2/2001 | Gehrke et al. |
| 6,317,049 | B1 * | 11/2001 | Toubia et al. ............... 340/573.4 |
| 6,317,474 | B1 | 11/2001 | Carsello |
| 7,233,800 | B2 | 6/2007 | Laroia et al. |
| 7,706,328 | B2 | 4/2010 | Mukkavilli et al. |
| 7,729,707 | B2 | 6/2010 | Aljadeff et al. |
| 7,813,383 | B2 | 10/2010 | Wang et al. |
| 7,817,616 | B2 | 10/2010 | Park et al. |
| 7,826,343 | B2 | 11/2010 | Krasner |
| 7,893,873 | B2 | 2/2011 | Black et al. |
| 7,940,740 | B2 | 5/2011 | Krishnamurthy et al. |
| 8,165,586 | B2 | 4/2012 | Krishnamurthy et al. |
| 8,228,923 | B1 | 7/2012 | Jain et al. |
| 8,233,432 | B2 | 7/2012 | Northcutt et al. |
| 2001/0004601 | A1 | 6/2001 | Drane et al. |
| 2001/0034238 | A1 | 10/2001 | Voyer |
| 2003/0036390 | A1 | 2/2003 | Villier et al. |
| 2003/0119523 | A1 * | 6/2003 | Bulthuis ........................ 455/456 |
| 2003/0189948 | A1 | 10/2003 | Sashihara |

(Continued)

FOREIGN PATENT DOCUMENTS

| CN | 1288645 A | 3/2001 |
| CN | 1454013 A | 11/2003 |

(Continued)

OTHER PUBLICATIONS

3GPP TR 36.942 V8.1.0 (Dec. 2008), 3rd Generation Partnership Project: Technical Specification Group Radio Access Network; Evolved Universal Terrestrial Radio Access (E-UTRA); Radio Frequency (RF) system scenarios; (Release 8), Dec. 2008.

(Continued)

*Primary Examiner* — Marcos Batista
(74) *Attorney, Agent, or Firm* — Arnold J. Gum; Mary A. Fales

(57) ABSTRACT

The subject matter disclosed herein relates to concurrently estimating locations for one or more mobile stations and one or more wireless transmitters.

56 Claims, 10 Drawing Sheets

(56) References Cited

U.S. PATENT DOCUMENTS

| | | |
|---|---|---|
| 2004/0033808 A1 | 2/2004 | Rorabaugh |
| 2005/0153653 A1 | 7/2005 | Diao et al. |
| 2005/0192024 A1* | 9/2005 | Sheynblat ............... 455/456.1 |
| 2005/0281247 A1 | 12/2005 | Lim et al. |
| 2007/0040703 A1 | 2/2007 | Akkarakaran et al. |
| 2007/0075899 A1 | 4/2007 | Inaba |
| 2007/0121560 A1 | 5/2007 | Edge |
| 2007/0176826 A1 | 8/2007 | Daniele et al. |
| 2007/0177605 A1 | 8/2007 | Benco et al. |
| 2008/0125161 A1* | 5/2008 | Ergen et al. ................ 455/524 |
| 2008/0126161 A1 | 5/2008 | Willis et al. |
| 2008/0132247 A1 | 6/2008 | Anderson |
| 2008/0137691 A1 | 6/2008 | Barry et al. |
| 2008/0232517 A1 | 9/2008 | Terabe et al. |
| 2008/0274750 A1 | 11/2008 | Carlson et al. |
| 2008/0285505 A1 | 11/2008 | Carlson et al. |
| 2009/0034459 A1 | 2/2009 | Shousterman et al. |
| 2009/0097452 A1 | 4/2009 | Gogic |
| 2009/0149169 A1 | 6/2009 | Tanno et al. |
| 2010/0014443 A1* | 1/2010 | Cristian et al. ............. 370/255 |
| 2010/0029295 A1 | 2/2010 | Touboul et al. |
| 2010/0054237 A1 | 3/2010 | Han et al. |
| 2010/0074180 A1 | 3/2010 | Palanki et al. |
| 2010/0110983 A1 | 5/2010 | Fu |
| 2010/0172311 A1 | 7/2010 | Agrawal et al. |
| 2010/0232543 A1 | 9/2010 | Sampath et al. |
| 2010/0260154 A1 | 10/2010 | Frank et al. |
| 2010/0273506 A1 | 10/2010 | Stern-Berkowitz et al. |
| 2010/0279707 A1 | 11/2010 | Fischer et al. |
| 2010/0322184 A1 | 12/2010 | Xiao |
| 2011/0103338 A1 | 5/2011 | Astely et al. |
| 2011/0124347 A1 | 5/2011 | Chen et al. |
| 2011/0188438 A1 | 8/2011 | Lee et al. |
| 2011/0237270 A1 | 9/2011 | Noh et al. |
| 2011/0317641 A1 | 12/2011 | Noh et al. |
| 2012/0027110 A1 | 2/2012 | Han et al. |
| 2012/0046047 A1 | 2/2012 | Popovic et al. |
| 2012/0057498 A1 | 3/2012 | Han et al. |
| 2012/0120842 A1 | 5/2012 | Kim et al. |
| 2012/0120903 A1 | 5/2012 | Kim et al. |
| 2012/0120917 A1 | 5/2012 | Shimomura et al. |
| 2012/0165012 A1 | 6/2012 | Fischer et al. |
| 2012/0188129 A1 | 7/2012 | Ameti et al. |
| 2012/0189041 A1 | 7/2012 | Ko et al. |
| 2012/0229337 A1 | 9/2012 | Parker |

FOREIGN PATENT DOCUMENTS

| | | |
|---|---|---|
| CN | 1595836 A | 3/2005 |
| CN | 1628488 A | 6/2005 |
| CN | 1826538 A | 8/2006 |
| EP | 1148755 A1 | 10/2001 |
| EP | 1041746 B1 | 8/2003 |
| EP | 1355450 A1 | 10/2003 |
| EP | 1396730 A1 | 3/2004 |
| EP | 1887823 A1 | 2/2008 |
| EP | 1898542 A1 | 3/2008 |
| JP | 2003520532 A | 7/2003 |
| JP | 2004101254 A | 4/2004 |
| JP | 2007089113 A | 4/2007 |
| JP | 2008002866 A | 1/2008 |
| JP | 2008236382 A | 10/2008 |
| JP | 2008236383 A | 10/2008 |
| JP | 2010500794 A | 1/2010 |
| JP | 2010525633 A | 7/2010 |
| KR | 100824044 B1 | 4/2008 |
| RU | 2179371 C1 | 2/2002 |
| RU | 2233033 C2 | 7/2004 |
| TW | I223534 B | 11/2004 |
| WO | 0154422 A2 | 7/2001 |
| WO | 03055272 A1 | 7/2003 |
| WO | 2004104621 | 12/2004 |
| WO | 2005041602 A1 | 5/2005 |
| WO | 2005081012 A1 | 9/2005 |
| WO | 2006109538 A1 | 10/2006 |
| WO | 2008073706 A1 | 6/2008 |
| WO | 2008127185 A1 | 10/2008 |
| WO | 2009149104 A2 | 12/2009 |

OTHER PUBLICATIONS

3GPP TS 25.215 V8.2.0 (Sep. 2008), 3rd Generation Partnership Project; Technical Specification Group Radio Access Network: Physical layer—Measurements (MD) (Re ease 8), Sep. 2008.

3GPP TS 25.305 V8.0.0 (Dec. 2007), 3rd Generation Partnership Project; Technical Specification Group Radio Access Network; Stage 2 functional specification of User Equipment (LiE) positioning in UTRAN (t=Zelease 8), Dec. 2007.

Chan Y.T, et al., "A Simple and Efficient Estimator for Hyperbolic Location", IEEE Trans. Signal Processing, vol. 42, No. 5, pp. 1905-1915, Aug. 1994.

Ericsson: "Evaluation Of IP-DL Positioning Techniques Using Common Simulation Parameters", TDG-RSN Working Group 1 Meeting 8, Ad Hoc 17, TSGR1#8(99)g88, Manhattan, USA, Oct. 12-Oct. 15, 1999.

Evaluation of Positioning Measurement Systems, Source -, Ericsson, T1P1.5 8-110, May 15, 1998.

Evaluation parameters for positioning studies, Source: Qualcomm Europe, 3GPP TSG-RAN WG1 #56, R1-090853, Feb. 9-13, 2009, Athens, Greece.

"Functional description, Location Services (LCS), Stage 2", (Release 1999) Functional Description, 3GPP TS 03.71 V8.9.0 (Jun. 2004).

Further positioning evaluations, Source: Qualcomm Europe, 3GPP TSG-RAN WG1 #56, R1-090851—Feb. 9-13, 2009, Athens, Greece.

Greenstein J.L, et al., "A New Path -Gam/Delay- Spread Propagation Model for Digital Cellular Channels", IEEE Transactions on Vehicular Technology, vol. 46, No. 2, op. 477-485, May 1997.

International Search Report and Written Opinion -PCT/US2010/048495, International Search Authority—European Patent Office—Dec. 15, 2010.

Motorola: "Impact of Supporting "Blank" Subframes"3GPP TSG RAN Plenary Meeting No. 42 Dec. 5, 2008, XP002589696Athens, Greece Retrieved from the Internet:URL:http://www.3gpp.org/ftp/tsg_ran/tsg_ran/TSGR_42/ docs/ [retrieved on Jun. 28, 2010.

Patwari N, et al., "Relative Location Estimation in Wireless Sensor Networks", IEEE Transactions on Signal Processing, vol. 51, No. 8, Aug. 2003.

PHY layer specification impact of positioning improvements, Source: quatcomm Europe, 3GPP TSG-RAN WG1 #56, R1-090852, Feb. 9-13, 2009, Athens, Greece.

Positioning Support for LTE, 3GPP TSG RAN#42, RP-080995, Dec. 2-5, 2008, Athens, Greece.

Qualcomm Europe: Impact of Blank Subframes on Intrafrequency Measurements'A GPP TSG-RAN WG4 No. 49 Nov. 6, 2008, XP002589699Prague, CZ Retrieved from the Internet:URL:http://www.3gpp.org/ftp/tsg_ran/ wg4_radio/TSGR4_49/Documents/ [retrie.

Qualcomm Europe: "Way forward on forward compatible subframes for Rel-8"3GPP TSG RAN Plenary Meeting No. 42 Dec. 5, 2008, XP002589697Athens, Greece Retrieved from the Internet:URL:http://www.3gpp.org/ftp/ tsg٨ ran/tsg_ran/TSGR_42/docs/ [re.

Qualcomm Europoe "On OTDOA in LTE" 3GPP Draft R1-090353, 3rd Generation Partnership Porject (3GPP) Mobile Competence Centre, 650, Rout Des Lucioles F-06921 Sophia-Antipolis Cedex France No Ljubljana Jan. 8, 2009.

Recapitulation of the IPDL positioning method, Source: Encsson, TSG-RAN Working Group 1 meeting #4 TSGR1#4 (99)346, Apr. 18-20, 1999, Shin-Yokohama, Japan.

"Stage 2 functional specification of User Equipment (UE) positioning in UTRAN" (Release 9) Technical Specification 3GPP TS 25.305 V9.0.0 (Dec. 2009).

(56) References Cited

OTHER PUBLICATIONS

Time Aligned iP-DL positioning technique, Source: Motorola, TSG-RAN Working Group 1, Ah Hoc 17, TSGR1#: 9 b79, Meeting 7, Aug. 30-Sep. 3, 1999, Hannover, Germany.
Ward P. W: "A Design Technique to Remove the Correlation Ambiguity in Binary Offset Carrier (BOC) Spread Spectrum Signals" Proceedings of the ION National Technical Meeting, The Institute of Navigation, US, Jan. 26, 2004, pp. 886-896, XP001207302 the whole document.

Wu Q, et al., "CDMA2000 Highly Detectable Pilot Communications Workshops, 2008. ICC Workshops" 08. IEEE International Conference On, IEEE, Piscataway, NJ, USA, May 19, 2008, pp. 16-20, XP031265196 ISBN: 978-1-4244-2052-0 p. 1, Left-Hand Column, Line 8—p. 1, Right-Hand Column, Line 31.
Xiao J, et al., "Research of TDOA Based Self-localization Approach in Wireless Sensor Network", Intelligent Robots and Systems, 2006 IEEE/RSJ International Conference on, IEEE, Pl, Oct. 1, 2006, pp. 2035-2040, XP031006391, ISBN: 978-1-4244-0258-8.

\* cited by examiner

CONCURRENT WIRELESS TRANSMITTER MAPPING AND MOBILE STATION POSITIONING

CROSS-REFERENCE TO PENDING PROVISIONAL APPLICATION

This application claims priority under 35 USC 119 to U.S. Provisional Application No. 61/241,353, filed Sep. 10, 2009 and entitled "Localization and Mapping of Terrestrial Positioning Sources Based on Mobile Measurements" which is assigned to the assignee hereof and which is incorporated herein by reference.

BACKGROUND

1. Field

The subject matter disclosed herein relates to mapping wireless transmitters and mobile stations, and more particularly to concurrently determining locations for one or more mobile stations and one or more wireless transmitters.

2. Information

The position of a mobile station, such as a cellular telephone, may be estimated based on information gathered from various systems. One such system may comprise a wireless network compatible with one or more of the Institute of Electrical and Electronics Engineers (IEEE) 802.11 wireless local access network (WLAN) standards, which may also be referred to as a Wi-Fi network. Such a network may include wireless transmitters/receivers often referred to as "access points," for example.

A position estimate, which may also be referred to as a position "fix", for a mobile station may be obtained based at least in part on distances or ranges measured from the mobile station to one or more wireless transmitters, and also based at least in part on knowledge of the locations of the one or more wireless transmitters. Accuracy or availability of mobile station positioning systems may depend, at least in part, on wireless access point mapping, wherein information related to wireless access points including estimated locations may be stored in a database.

SUMMARY

In an aspect, a plurality of range measurements from one or more mobile stations with unknown positions may be received at a computing platform, the plurality of range measurements comprising one or more range measurements to one or more wireless transmitters with unknown positions and one or more range measurements to one or more wireless transmitters with known positions. Locations for the one or more mobile stations with unknown positions and for the one or more wireless transmitters with unknown positions may be concurrently determined.

BRIEF DESCRIPTION OF THE FIGURES

Non-limiting and non-exhaustive examples will be described with reference to the following figures, wherein like reference numerals refer to like parts throughout the various figures.

DETAILED DESCRIPTION

Figure 1:
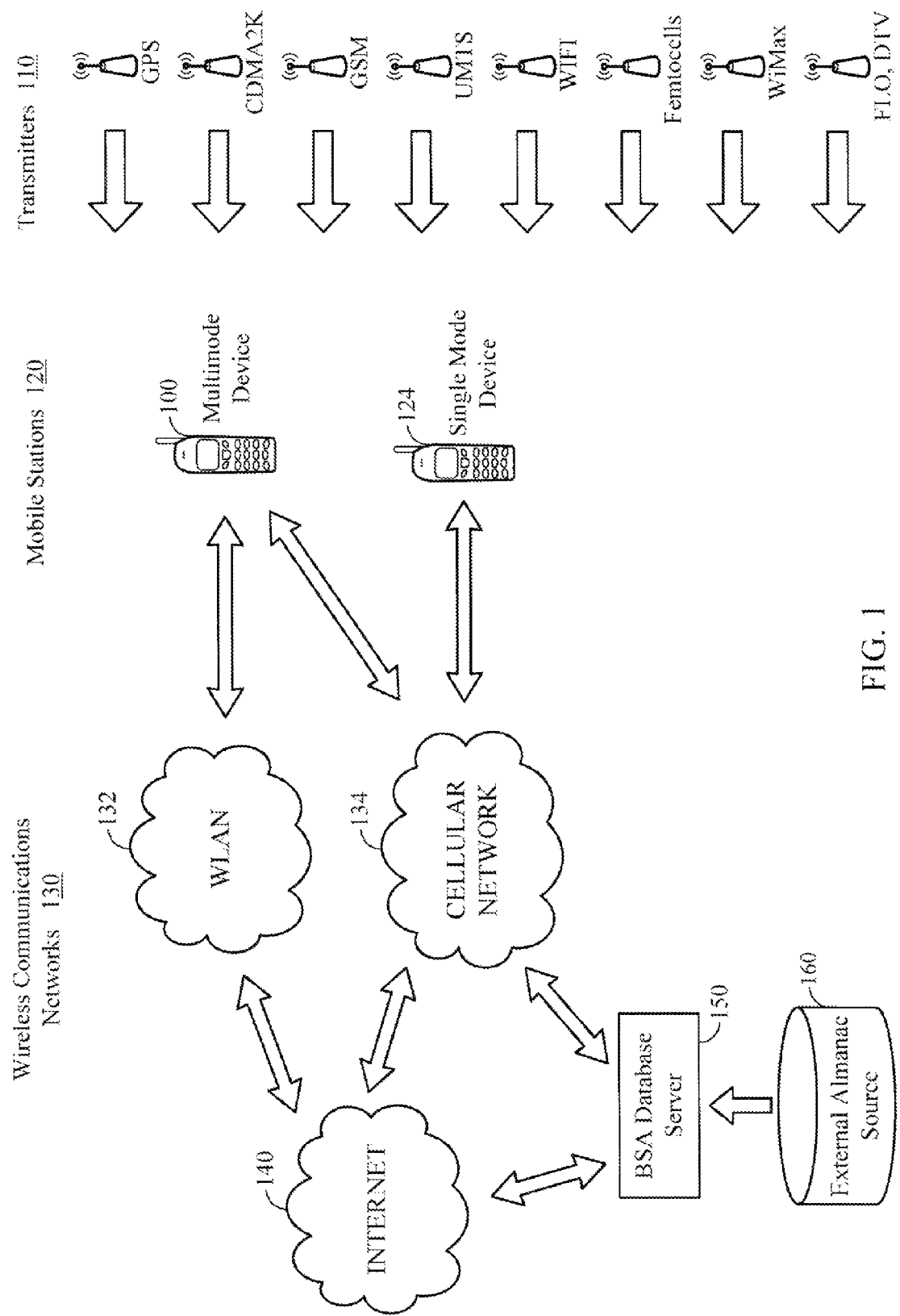
FIG. 1 is an illustration depicting example mobile stations in communication with an example almanac server via one or more wireless communication networks.

As discussed above, a position of a mobile station, such as a cellular telephone, may be estimated based on information gathered from various systems. Such systems may include wireless communication systems including, for example, cellular communication systems or wireless local area networks, to name just a couple of example types of wireless communication systems. Wireless communication systems may employ one or more wireless transmitters/receivers that may be referred to as "base stations" or "access points", for example. As used herein, the terms "base station" and "access point" represent example types of "wireless-transmitters", although the scope of claimed subject matter is not limited in this respect. As used herein, the term "wireless transmitter" is meant to include any transmitter or transmitter/receiver of wireless signals compatible with any type of wireless communication system.

A position estimate, which may also be referred to as a position "fix", for a mobile station may be obtained based at least in part on distances or ranges measured from the mobile station to one or more wireless transmitters, and also based at least in part on knowledge of the locations of the one or more wireless transmitters. Accuracy or availability of mobile station positioning systems may depend, at least in part, on wireless transmitter mapping, wherein information related to wireless transmitters including estimated locations may be stored in a database. In some applications, such as database may be referred to as an almanac.

An almanac may be maintained for systems used for position estimation. The almanac may contain various types of information, including, for example, information that may be used in position estimation operations. Such information may include the identities and locations of various wireless transmitters of one or more wireless communication systems, for example. An almanac may be stored in a memory of a computing platform, such as an almanac server, for example, or in a memory of mobile station, for another example. In another aspect, an almanac may be transmitted from an almanac server to one or more mobile stations.

To develop almanac databases for use in mobile station positioning operations, information may be directly collected by system operators. For example, for WiFi access points (AP) within an interior of a building, a survey may be made by physically examining the interior and noting locations of any discovered access points. However, difficulties may be encountered in determining accurate or complete information for WiFi APs by direct collection from the AP owners. Information collected in this manner may be erroneous, outdated, or missing. For an example of how difficulties may arise in collecting AP location information, consider that it may be relatively easy for an individual to move an AP from one location to another location, or to replace an AP with a new AP. AP location data collection may pose a significant obstacle to the expansion of mobile station location operations for indoor areas. Even if a thorough survey of all APs in a particular indoor area is performed, perhaps at a significant cost, the surveying process would need to be redone every several months, or perhaps more often, in order to keep up with changes and try to ensure acceptably accurate AP location information. However, even if such a survey were to be performed every several months, significant changes to AP configuration may be observed. Such overhead in operating a system of wireless access points for use in mobile station position fix operations may result relatively large costs, and may result in unreliable or inaccurate position fix performance in some cases.

In an aspect, the survey process discussed above for data collection for wireless AP almanac information may be replaced by a background data collection operation performed by mobile stations of a wireless communication system, such as a WiFi system, for example. In an aspect, WiFi access points or other various terrestrial ranging or positioning sources may be mapped using measurements from mobile stations. In a further aspect, mobile station positions and AP locations may be estimated concurrently by formulating a relatively large least squares calculation providing a flexible solution adaptive to a given set of range measurements. In an additional aspect, measurements from multiple mobile stations taken at multiple points in time may be aggregated in order to improve mobile station positioning and AP location accuracy and availability. Accumulated AP observations over time by multiple users may provide statistical significance to help ensure mobile station positioning accuracy.

In addition to the multi-user aspects mentioned above, another aspect may support single user autonomous mapping of APs with or without server assistance. Single user autonomous mapping of APs is discussed more fully below. In another aspect, also discussed below, a mirroring effect may occur on some occasions due to collinear observation of an AP as a mobile station moves in a relatively straight path, and two competing minimum solutions for AP location may be generated. In an aspect, multi-seeded positioning operations may be utilized in order to reduce outliers due to mirroring effect. Multi-seeded positioning operations are also discussed further below.

FIG. 1 is an illustration depicting example mobile stations 100 and 124 in communication with an example almanac server 150 via one or more wireless communication networks 132 and 134, or via Internet 140. For this example, mobile station 100 represents a multi-mode device that may support communication with both a wireless local area network (WLAN) 132 and a cellular network 134. For one example, WLAN 132 may comprise a packet-switched wireless network compatible with one or more of the IEEE 802.11x standards. Of course, these are merely examples of the types of wireless communications networks with which a multi-mode device may communicate, and the scope of claimed subject matter is not limited in this respect. Also for this example, mobile station 124 represents a single-mode device that may support communication with cellular network 134. Again, the cellular network is merely one example of a wireless communication network with which a mobile station may establish communication.

FIG. 1 further depicts a number of transmitter types 110 with which mobile stations 100 and 314 may communicate. Mobile stations 100 and 124 may or may not be subscribed to any given network associated with the various respective transmitter types to be able to monitor signals transmitted from the various transmitter types. Almanac server 150 may provide wireless transmitter almanac information to mobile stations 100 or 124. Also, although the example of FIG. 1 depicts two mobile stations, in practice a wide variety of mobile station types exhibiting a wide range of different functionalities or storage capabilities may be utilized to communicate with a large variety of potential network types. Further, mobile stations may exhibit a wide range of different usage patterns.

As used herein, the term "wireless transmitter" is meant to include any station or device utilized to transmit wireless signals. The term "wireless transmitter" is also meant to include any wireless communication station or device utilized to facilitate communication in a wireless communications system, such as, for example, a cellular network, although the scope of claimed subject matter is not limited in this respect. An example type of wireless transmitter utilized in a cellular network may be referred to as a base station. In another aspect, a wireless transmitter may comprise a femtocell, utilized to extend cellular telephone service into a business or home, for example. In such an implementation, one or more mobile stations may communicate with a femtocell via a code division multiple access (CDMA) cellular communication protocol, for example, and the femtocell may provide the mobile station access to a larger cellular telecommunication network by way of another broadband network such as the Internet. In another aspect, wireless transmitters may be included in any of a range of electronic device types. In an aspect, a wireless transmitter may comprise a WLAN access point (AP), for example. Such a WLAN may comprise a network that is compatible with one or more of the IEEE 802.11x standards, in an aspect, although the scope of claimed subject matter is not limited in this respect. Additionally, the use herein of the term "transmitter" in describing a device does not limit that device's function to transmitting only. For example, base stations and access points are typically capable of both transmitting and receiving wireless signals.

As used herein, the term "mobile station" (MS) refers to a device that may from time to time have a position that changes. Such changes in position may comprise changes to direction, distance, orientation, etc., as a few examples. In particular examples, a mobile station may comprise a cellular telephone, wireless communication device, user equipment, laptop computer, other personal communication system (PCS) device, personal digital assistant (PDA), personal audio device (PAD), portable navigational device, or other portable communication devices. A mobile station may also comprise a processor or computing platform adapted to perform functions controlled by machine-readable instructions.

Figure 2:
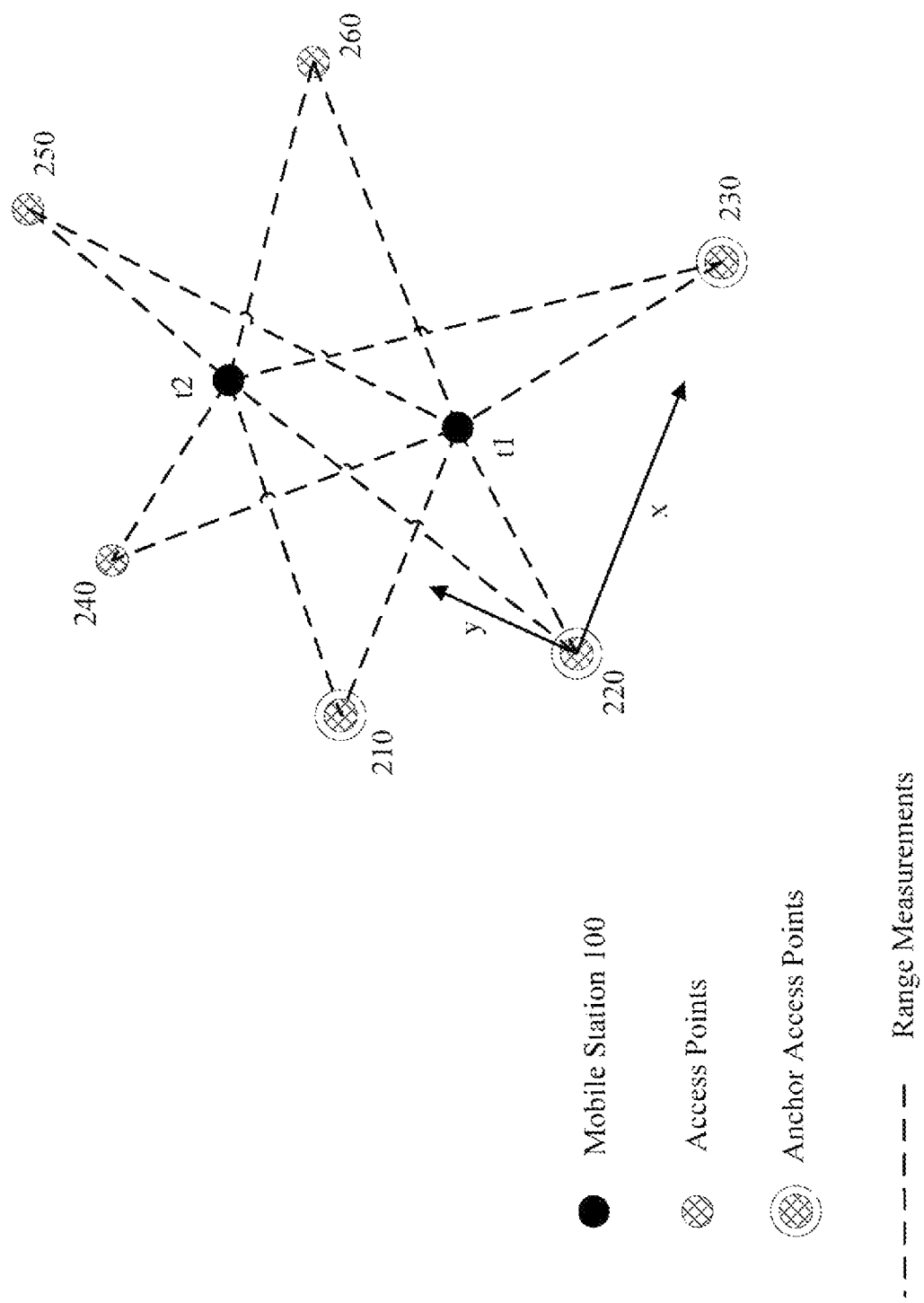
FIG. 2 is an illustration of an example process for concurrently estimating positions for one or more mobile stations and one or more wireless access points.

FIG. 2 is an illustration of an example system for concurrently estimating positions for one or more mobile stations and one or more wireless transmitters. In an aspect, terrestrial wireless transmitters such as WiFi access points or cellular base stations may be mapped using measurements from mobile stations without additional measurements from other sources. In FIG. 2, example wireless transmitters may comprise WiFi APs, although the scope of claimed subject matter is not limited in this respect. As used herein, the term "anchor AP" refers to an access point with a position that is known with sufficient accuracy to allow the access point be used in position estimation operations for access points or mobile stations whose positions are unknown or not known with a sufficient degree of accuracy for a given application. Also as used herein, the term "non-anchor AP" refers to an access point that does not have a position known with sufficient accuracy for a given application to allow the access point be used in position estimation operations. Of course, an access point is merely an example type of wireless transmitter, and the scope of claimed subject matter is not limited in this respect. Further, although the terms "anchor" and "non-anchor" are utilized in describing access points of various examples discussed herein, the terms may also be applied to other types of wireless transmitters.

Additionally, the term "known" as used herein in connection with a position of a mobile station or a position of a wireless transmitter refers to a position that has been measured or estimated with a level of accuracy sufficient for a given application. For example, for a pedestrian navigation application, positions estimated or measured to within several meters may be considered to be "known" positions, although the scope of claimed subject matter is not limited in this respect. Similarly, the term "unknown" as used herein in connection with a position of a mobile station or a position of a wireless transmitter refers to a position that has not been measured or estimated at all or has not been measured or estimated with a level of accuracy sufficient for a given application.

For the example of FIG. 2, anchor APs 210, 220, and 230 are provided, as well as non-anchor APs 240, 250, and 260. Also for the example of FIG. 2, mobile station 100 may comprise a mobile station whose position is to be estimated. Mobile station 100, for the example depicted in FIG. 2, may take range measurements from communication with anchor APs 210, 220, and 230 and non-anchor APs 240, 250, and 260 at two distinct points in time, t1 and t2. In other examples, multiple mobile stations may be utilized to gather measurement information. In another aspect, concurrent estimation of positions for one or more mobile stations, such as mobile station 100, and one or more wireless transmitters, such as non-anchor APs 240, 250, and 260 may utilize any combination of indoor and outdoor wireless transmitters.

In aspect, anchor APs 210, 220, or 230 may be utilized as references against which relative positions of mobile station 100 and non-anchor APs 240, 250, and 260 may be mapped. In an aspect, a local coordinate system may be defined having an origin for this example at anchor AP 220. An "x" axis and a "y" axis for the example local coordinate system are depicted in FIG. 2. In the example of FIG. 2, anchor AP 210 may be utilized to resolve mirror ambiguity about the "x" axis. Mirror ambiguity is discussed more fully, below. In an aspect, if absolute positions of anchor points are known, both mobile stations and non-anchor APs may be mapped in absolute coordinates. An example coordinate system may comprise a WGS84 coordinate system, although the scope of claimed subject matter is not limited in this respect. In a further aspect, access points may be assumed to be static, and measurements from multiple mobile stations taken at multiple points in time may be aggregated. If significant disagreement is discovered among measurements related to a particular AP, a check may be made to determine whether that particular AP has been relocated, perhaps by physical examination.

In an aspect, and in general, three or more non-collinear anchor APs may be utilized to estimate a position of a mobile station. Similarly, three or more non-collinear measurements from one or more anchor mobile stations may be utilized to map an AP. Example techniques for performing such calculations are described in more detail, below.

In an aspect, a least squares solutions may be utilized for concurrent mapping of wireless transmitters and position estimation for mobile stations. A least squares operation may comprise setting a plurality of seed locations corresponding to a respective plurality of mobile stations or non-anchor access points whose locations are to be estimated. A plurality of range estimates based at least in part on the plurality of seed locations may be calculated, and a difference between the plurality of range estimates and a plurality of range measurements may be calculated. The plurality of range measurements for this example may comprise range measurements between one or more mobile stations and one or more APs. In an aspect, if a calculated difference between range estimates and range measurements is below a specified threshold, the plurality of seed locations may be utilized as estimated positions for the respective plurality of mobile stations or APs whose estimated positions are being determined.

In another aspect, if a calculated difference between range estimates and range measurements is not below a specified threshold, the plurality of seed locations may be updated based at least in part on the calculated difference between the plurality of range estimates and the plurality of range measurements. A plurality of range estimates may be re-calculated based at least in part on the plurality of updated seed locations, and a difference between the re-calculated plurality of range estimates and the plurality range measurements may be calculated. If the difference is below the specified threshold, the updated seed locations may be utilized as estimated locations for the respective plurality of mobile stations or non-anchor APs whose locations are to be estimated.

A more detailed explanation of an example technique for concurrent mapping of access points and positioning of mobile stations is provided. A matrix of pseudorange measurements $\rho_{i,j}$ between mobile stations $u_i$ and access points $s_j$ may be given as follows in a non-linear equation:

$$\rho_{i,j} = \|\bar{u}_i - \bar{s}_j\| + b_i + B_j + \epsilon_{i,j} \tag{1}$$

where $b_i$ comprises a mobile specific measurement bias, $B_j$ comprises a ranging source specific measurement bias, and $\epsilon_{i,j}$ is an un-modeled random measurement noise. $b_i$ and $B_j$ may represent time biases of receiver and transmitter if a range measurement is based on time measurements such as time of arrival (TOA), time difference of arrival (TDOA) or round trip time (RTT). In another aspect, biases may relate to received signal strength (RSS) measurements. Biases may be ignored in some circumstances if not significant compared to the random noise, in an aspect. Note that while example techniques described herein may describe access points as wireless transmitters, an access point is merely an example type of wireless transmitter. The scope of claimed subject matter is not limited with respect to type of wireless transmitter.

Continuing with the example, assume K mobile locations which are from either a single mobile station in K locations at various points in time or K combined measurements from multiple mobile stations ($i \in \{1, 2, \ldots, K\}$). For the example, there are L anchor APs at known locations ($j \in \{1, 2, \ldots, L\}$) and M non-anchor APs at unknown locations ($j \in \{1, 2, \ldots, M\}$). In the description to follow, to distinguish between anchor and non-anchor access points, measurements related to anchor access points are denoted with a superscript with "A." A set of measurements at an $i^{th}$ mobile station location is $\bar{\rho}_i = [\rho_{i,1}^A \ldots \rho_{i,L}^A, \rho_{i,1} \ldots \rho_{i,M}]$ and the aggregated mobile station measurements may be given as follows:

$$\bar{\rho} = [\bar{\rho}_1, \bar{\rho}_2 \ldots \bar{\rho}_K]^T \tag{2}$$

Mobile station variables including location and measurement bias at an $i^{th}$ mobile location may comprise $y_i=[u_i^E u_i^N b_i]$ and the source variables at $j^{th}$ ranging source may comprise $z_j=[s_j^E s_j^N B_j]$ for two dimensional positioning operations. Because three dimensional positioning may be viewed as an extension of two dimensional positioning with an addition of an altitude component, a two dimensional example technique is described here for simplicity. Also, this example uses a relative coordinate system from a certain reference point in ENU (east, north, and up) convention. However, an absolute coordinate system such as WGS84 may be used as well. Previously given expression (1) may expand as follows:

$$\rho_{i,j}=\|u_i-s_j\|+b_i+B_j+\epsilon_{i,j}= \sqrt{(u_i^E-s_j^E)^2+(u_i^N-s_j^E)^2}+b_i+B_j+\epsilon_{i,j} \quad (3)$$

For ease of explanation and reading, a set of variables to be solved may be combined into a symbol "x", given in a 3(K+M) vector $$\bar{x}=[\bar{y}_1 \bar{y}_2 \ldots \bar{y}_K \bar{z}_1 \bar{z}_2 \ldots \bar{z}_M]^T \quad (4)$$

Target variable x represents K mobile locations and M non-anchor transmitters.

As seen above, a nonlinear expression may be formed with a given measurement of $\bar{\rho}$. An iterative and incremental linear solution for estimating variables x may be based at least in part on a Taylor expansion, in an aspect, although the scope of claimed subject matter is not limited in this respect. Such an iterative technique may comprise, for example:

Set a seed location, $\hat{x}=\bar{x}_0$,
Calculate range estimate $\hat{\rho}$ from $\hat{x}$ based at least in part on expression (3)
Calculate a difference between range measurement and range estimate, $\delta\bar{\rho}=\bar{\rho}-\hat{\rho}$
Stop if $\delta\bar{\rho}$ is sufficiently small. In an aspect, a determination may be made as to whether the difference is below a specified error threshold.
Update variable estimate, $\delta\hat{x}=(\overline{WG})^+\overline{W}\delta\bar{\rho}$ and $\hat{x}=\hat{x}+\delta\hat{x}$
Return to "Calculate range estimate"

where W comprises a weighting matrix and G comprises a geometry matrix, described below.

Individual range measurements may have different levels of expected errors, and therefore may convey different levels of accuracy to an estimation process. To properly reflect the level of measurement errors, a weighting matrix, W, may be incorporated into the least squares solution. The relationship between $\delta\bar{\rho}$ and $\delta\bar{x}$ may be approximated as follows where v comprises a residual measurement error vector.

$$\overline{W}\delta\bar{\rho}=\overline{WG}\delta\bar{x}+\overline{W}v \quad (5)$$

In an aspect, for a situation with Gaussian distributed measurement noise, a weighting matrix may be derived from the covariance of v, $\overline{W}=\Sigma_v^{-1/2}$, although the scope of claimed subject matter is not limited in this respect. A weighting matrix solution may deviate from the above according at least in part to a given nature of measurements, in a further aspect.

In an additional aspect, geometry matrix G may represent geometric relationships of a mobile station location and anchor and non-anchor APs.

$$\bar{G} = \begin{bmatrix} \vec{F}_1 & 0 & 0 & \vec{R}_1 \\ 0 & \ddots & 0 & \vdots \\ 0 & 0 & \vec{F}_K & \vec{R}_K \end{bmatrix} \quad (6)$$

The G matrix may comprise $\bar{F}_i$ and $\bar{R}_i$, respectively representing forward and reverse positioning geometry matrices. As used herein, the term "forward positioning" refers to estimation of a mobile station position based at least in part on wireless transmitters such as anchor APs. The term "reverse positioning" refers to estimation of a wireless transmitter location based at least in part on multiple mobile station locations. In a further aspect, a forward geometry matrix for an $i^{th}$ mobile location represents geometric relationship of a mobile station location with anchor and non-anchor access points, and may be given as follows:

$$F_i = \begin{bmatrix} \frac{\partial \rho_{i,1}^A}{\partial u_i^E} & \frac{\partial \rho_{i,1}^A}{\partial u_i^N} & \frac{\partial \rho_{i,1}^A}{\partial b_i} \\ \vdots & \vdots & \vdots \\ \frac{\partial \rho_{i,L}^A}{\partial u_i^E} & \frac{\partial \rho_{i,L}^A}{\partial u_i^N} & \frac{\partial \rho_{i,L}^A}{\partial b_i} \\ \frac{\partial \rho_{i,1}}{2\partial u_i^E} & \frac{\partial \rho_{i,1}}{2\partial u_i^N} & \frac{\partial \rho_{i,1}}{2\partial b_i} \\ \vdots & \vdots & \vdots \\ \frac{\partial \rho_{i,M}}{2\partial u_i^E} & \frac{\partial \rho_{i,M}}{2\partial u_i^N} & \frac{\partial \rho_{i,M}}{2\partial b_i} \end{bmatrix} = \begin{bmatrix} \frac{\hat{u}_i^E - s_1^{A,E}}{\|\hat{u}_i^E - s_1^A\|} & \frac{\hat{u}_i^E - s_1^{A,N}}{\|\hat{u}_i^E - s_1^A\|} & 1 \\ \vdots & \vdots & \vdots \\ \frac{\hat{u}_i^E - s_L^{A,E}}{\|\hat{u}_i^E - s_L^A\|} & \frac{\hat{u}_i^N - s_L^{A,N}}{\|\hat{u}_i^E - s_L^A\|} & 1 \\ \frac{\hat{u}_i^E - \hat{s}_1^E}{2\|\hat{u}_i - \hat{s}_1\|} & \frac{\hat{u}_i^N - \hat{s}_1^N}{2\|\hat{u}_i - \hat{s}_1\|} & 1/2 \\ \vdots & \vdots & \vdots \\ \frac{\hat{u}_i^E - \hat{s}_M^E}{2\|\hat{u}_i - \hat{s}_M\|} & \frac{\hat{u}_i^N - \hat{s}_1^N}{2\|\hat{u}_i - \hat{s}_M\|} & 1/2 \end{bmatrix} \quad (7)$$

which comprises a (L+M) by 3 matrix. In the expression above, $\hat{u}_i$ and $\hat{s}_j$ represent most recent estimates for mobile station and non-anchor access point locations, respectively. In a situation where one or more access points are not observed, the matrix may be reduced in size to remove one or more rows corresponding to the unobserved access points.

In an additional aspect, a reverse geometry matrix for $i^{th}$ mobile location may represent a geometric relationship of a mobile station location with non-anchor access point locations, and may be given as follows.

$$R_i = \begin{bmatrix} 0_{L \times 3M} \\ \begin{matrix} \frac{\partial \rho_{i,1}}{2\partial s_1^E} & \frac{\partial \rho_{i,1}}{2\partial s_1^N} & \frac{\partial \rho_{i,1}}{2\partial B_i} & & 0 \\ & & & \ddots & \\ 0 & & & \frac{\partial \rho_{i,1}}{2\partial s_M^E} & \frac{\partial \rho_{i,1}}{2\partial s_M^N} & \frac{\partial \rho_{i,1}}{2\partial B_M} \end{matrix} \end{bmatrix}$$

$$= \begin{bmatrix} 0_{L \times 3M} \\ \begin{matrix} \frac{\hat{s}_1^E - \hat{u}_i^E}{2\|\hat{s}_1 - \hat{u}_i\|} & \frac{\hat{s}_1^N - \hat{u}_i^N}{2\|\hat{s}_1 - \hat{u}_i\|} & 1/2 & & 0 \\ & & & \ddots & \\ 0 & & & \frac{\hat{s}_M^E - \hat{u}_i^E}{2\|\hat{s}_M - \hat{u}_i\|} & \frac{\hat{s}_M^N - \hat{u}_i^N}{2\|\hat{s}_M - \hat{u}_i\|} & 1/2 \end{matrix} \end{bmatrix} \quad (8)$$

For reverse geometry matrix expression (8) above, an upper portion (L×3M) may be occupied by zeros since there are no direct measurements between anchor and non-anchor APs, for example as depicted in FIG. 2. A lower portion of $R_i$ may take a diagonal form where individual diagonal components comprise a 1 by 3 vector. In a further aspect, Rows of $R_i$ and $F_i$ may be sorted according to originating mobile station location. However, in an additional aspect, if forward or reverse geometry matrices are sorted according to individual ranging sources, $R_i$ and $F_i$ may be re-organized to be $\tilde{F}_i$ and $\tilde{R}_j$ specific to $j^{th}$ access point.

In a lower part of the forward geometry matrix and the reverse geometry matrix for the mobile stations and non-anchor access points, parameters are divided by two because the corresponding range measurement expression (e.g.

$$\left(\text{e.g. } \frac{\hat{u}_i^E - \hat{s}_1^E}{2\|\hat{u}_i - \hat{s}_1\|} \text{ in } F_i \text{ and } \frac{\hat{s}_1^E - \hat{u}_i^E}{2\|\hat{s}_1 - \hat{u}_i\|} \text{ in } R_i\right)$$

appears up twice, for this example. However, if the expression appears a single time (i.e., access point location is known or mobile station position is known), parameters may not be divided by two.

In a further aspect, x may be estimated incrementally using a Newton-Raphson technique—an iterative linear solution—as described above and as repeated here.

$$\delta \hat{x} = (\overline{WG})^\dagger \overline{W} \delta \overline{\rho} \tag{9}$$

based at least in part on a Moore-Penrose pseudo-inverse of the geometry matrix $(WG)^\dagger = (G^T W^T W G)^{-1} G^T W^T$, and on residual pseudorange measurements, $\delta \overline{\rho}$.

In the preceding discussion, a least squares approach to concurrent estimation of access point location and mobile station position may be employed. However, claimed subject matter is not limited in this respect. For example, a Kalman filter (KF) implementation may be utilized in an aspect to estimate a trajectory of a mobile station. A conversion from a least squares approach to that of a KF implementation may include replacing a geometry matrix and target variables. One difference for a KF implementation is that because mobile stations may be moving while access points are stationary, a KF state may not include velocity and acceleration for access points. Alternatively, KF may be utilized solely for mobile station position estimation.

In a further aspect, a mobile station trajectory resulting from a KF solution may be further processed by a least squares operation to remove mobile station location variables entirely if the KF estimation has an error value within a threshold of error appropriate for a given application or to be used as seed locations if the KF estimation error value is not within the error threshold. Additionally, in an aspect, a mobile station's inertial sensors may provide information that may improve location estimation accuracy or speed. It may be noted that existing location estimation solutions such as GPS implementations may be updated with example implementations without significantly re-architecting a mobile station so long as sufficient memory space and processing power is available.

A measurement covariance matrix may represent an expected level of errors in range measurements between $i^{th}$ mobile station location and $j^{th}$ access point. A measurement covariance matrix may be given as follows, $$\sum_v = \begin{vmatrix} \sigma_{(1,1)}^2 & \sigma_{(1,1),(1,2)} & \cdots \\ \sigma_{(1,1),(1,2)} & \sigma_{(1,2)}^2 & \cdots \\ \vdots & \vdots & \ddots \end{vmatrix}$$

wherein $\sigma_{(i,j)}^2$ comprises a variance measurement error of $\rho_{i,j}$ and $\sigma_{(i,j),(k,l)}$ comprises a covariance between $\rho_{i,j}$ and $\rho_{k,l}$. In general, $\sigma_{(i,j),(k,l)}$ may be set to zero unless there is known correlation between two range measurements. A measurement variance may comprise uncertainty from measurement as well as uncertainty of mobile station position and access point location. An expression for a variance of measurement error may be given as $$\sigma_{(i,j)}^2 = \sigma_{\rho i,j}^2 + \sigma_{ui}^2 + \sigma_{sj}^2 \tag{10}$$

For a mobile station positioning operation involving an SPS, because space vehicle (SV) location may be known to within a relatively high level of accuracy and because only positions of the mobile stations are to be estimated, a mobile station uncertainty aspect of the variance of measurement error expression may be eliminated, reducing the error expression to $\sigma_{(i,j)}^2 = \sigma_{\rho i,j}^2 + \sigma_{sj}^2$. In an aspect, uncertainty of variables to be estimated may be dropped from the variance of measurement error expression, and variances for remaining values may be kept in the expression. For a situation such as that depicted in FIG. 2 where both mobile station positions and access point locations may be unknown, some combinations of expression terms may result. For example, if mobile station positions $\overline{u}_i$ are to be estimated, $\sigma_{(i,j)}^2 = \sigma_{\rho i,j}^2 + \sigma_{sj}^2$. Similarly, if non-anchor access point locations $\overline{s}_j$ are to be estimated, $\sigma_{(i,j)}^2 = \sigma_{\rho i,j}^2 + \sigma_{ui}^2$. Because estimated mobile station positions or access point locations incur expected uncertainties, a range measurement from such an access point may include an uncertainty element in addition to measurement error.

In a further aspect, $\sigma_{sj}^2$ and $\sigma_{ui}^2$ may comprise elements of an estimation covariance matrix $\Sigma_x$, which may represent an uncertainty in estimated variables.

$$\sum_x = \begin{vmatrix} \sigma_{u_1}^2 & 0 & \cdots \\ 0 & \sigma_{u_2}^2 & \cdots \\ \vdots & \vdots & \ddots \end{vmatrix} \tag{11}$$

In another aspect, from $\Sigma_v$, W, and G, $\Sigma_x$ may be derived:

$$\Sigma_x = (WG)^\dagger W \Sigma_v W^T ((WG)^\dagger)^T \tag{12}$$

Further, if $W = \Sigma_v^{-1/2}$, $$\Sigma_x = (G^T \Sigma_v^{-1} G)^{-1} \tag{13}$$

For an SPS system, such as GPS, a geometry based parameter referred to as geometry dilution of position (GDOP) may be derived at least in part by assuming $\Sigma_v = \text{diag}(\sigma_\rho^2, \sigma_\rho^2, \ldots, \sigma_\rho^2)$ and $\Sigma_x = \sigma_\rho^2 (G^T G)^{-1}$.

In an aspect, an example process for covariance updating may comprise:

Generate measurement covariance matrix $\Sigma_v$ based at least in part on known uncertainty levels of anchor access points and of range measurements. Measurement uncertainty may be derived from signal to noise ratio or signal to interference ratio, to name a couple examples, as well as any other error sources.

Estimate variables x and calculate estimation covariance matrix $\Sigma_x$ as described above in expression (13).

Find a set of variables below a specified uncertainty threshold and fix those variables. In an aspect, a specified uncertainty threshold may comprise a threshold of one meter, although the scope of claimed subject matter is not limited in this respect.

Remove newly fixed variables from x and update $\Sigma_v$ based at least in part on error propagation expression $\sigma_{(i,j)}^2 = \sigma_{pi,j}^2 + \sigma_{ui}^2 + \sigma_{sj}^2$ as previous disclosed at expression (10).

Repeat the Estimate, Find, and Remove aspects described above until all variables are fixed.

Although specific examples are described above for covariance updating, the scope of claimed subject matter is not limited in these respects.

In a further aspect, a geometry matrix such as that described above may be built on a directional vector between a mobile station position and a wireless transmitter location. In situations involving an SPS, there may be a low probability that a mobile station and a wireless transmitter are in close proximity or are co-located. However, in situations involving terrestrial wireless transmitters, a mobile station and a wireless transmitter may be in close proximity on some occasions. For example, in WiFi mobile station positioning operations, a mobile station may come in close proximity to an access point at times. If a distance between a mobile station and a wireless transmitter becomes very small, instability may be introduced into a numerical solution. To avoid such instability, any of a number of example measures may be employed:

Seed locations may be set sufficiently distant from one another. A distance of greater than one meter may be specified, in an aspect.

While performing iterations of a process for concurrently estimating mobile station position and wireless transmitter location, individual location estimation variables may be set to be sufficiently distant from one another. In an aspect, if a determined distance between range measurements and range estimates is less than a specified threshold, an artificial distance may be injected between the range measurement and range estimate by moving a mobile station location in a direction opposite that of a corresponding wireless transmitter.

A weighting factor for corresponding measurements between mobile station positions and wireless transmitter locations may be utilized to avoid over influence from an individual measurement.

Of course, the above measures for avoiding instability in an estimation process are merely example measures, and the scope of claimed subject matter is not limited in these respects.

For concurrent mobile station position and wireless transmitter location estimation techniques, management of overall solution size may be a factor. For example techniques described herein, a solution size may grow large enough to exceed available computing resources. To avoid such a situation, an example process employing stages a-g for limiting an amount of mobile stations or wireless transmitters may be performed, as follows:

a) Find x number of mobile station locations (x=1 initially) with sufficient number of measurements from anchor or non-anchor wireless transmitters. An example sufficiency test process is described below.

b) Perform estimation process if a number of associated non-anchor wireless transmitters is less than a maximum number of variables.

c) Repeat stages a and b for all mobile station locations.

d) Find y number of wireless transmitters (y=1 initially) with sufficient number of measurements from mobile station locations. Example sufficiency test process is described below.

e) Proceed to concurrent estimation process if the number of associated known mobile station locations are less than a specified maximum number of variables. The specified maximum number of variables may depend, at least in part, on available computing resources.

f) Repeat stages d and e for all wireless transmitters.

g) Repeat stages a through f after incrementing x and y by one.

For the example solution size limiting process described above, a number of variables in individual estimations may be limited, while a total number of variables may by progressively reduced. In an alternative example process, stages d) through f) described above may precede stages a) through c). However, examples in accordance with claimed subject matter may comprise more than, less than, or all of stages a) through g). Further, the order of stages a) through g) is merely an example order, and claimed subject matter is not limited in this respect.

For various example techniques or processes described herein, range measurements between mobile stations and wireless transmitters are mentioned. Range measurements described herein may comprise or may be based at least in part on any of a variety of measurement types, including, for example, time of arrival (TOA), time difference of arrival (TDOA), round trip time (RTT), or received signal strength indicator (RSSI). As mentioned previously, bias terms specific to individual measurement types may be introduced into estimation solutions. Further, example techniques described herein may include various types of wireless transmitters. See, for example, FIG. 1, wherein example transmitter types 110 are depicted. Wireless transmitter types may include, for example, WiFi APs, cellular base-stations, cellular femtocell/picocell stations, broadcast television or radio stations, or SPS. SPS or television/radio broadcast stations may comprise example anchor transmitters, with known or estimated locations. Additionally, for situations where direct position estimates are available from a positioning system such as a SPS, one or more mobile station variables may be removed from a position estimation equation to reduce a number of variables. In another aspect, a position estimate provided by a SPS may be added as a measurement to an example estimation process such as described above with appropriate weighting. It should be noted that the measurement types and wireless transmitter types mentioned above are merely examples, and the scope of claimed subject matter is not limited in these respects.

In an aspect, positions for mobile stations or locations of non-anchor wireless transmitters may be estimated using example techniques described herein if sufficient measurements are available. For a two-dimensional concurrent mobile station positioning and wireless transmitter location estimation technique such as that described above, an unknown mobile station position or wireless transmitter location may be associated with three or more variables, including a location in a two dimensional coordinate system and a range bias. Thus, in an aspect, example concurrent estimation techniques may allow for three or more measurements associated with individual unknown mobile station positions or wireless transmitter locations. An overall amount of variables may be expressed as $3(K+M)$, and a maximum amount of measurements may be expressed as $K(L+M)$, where K comprises an amount of mobile stations, L comprises an amount of anchor wireless transmitters, and M comprises an amount of non-anchor wireless transmitters. Because not all wireless transmitters may be observed at each mobile station, a variable $L_i(\leq L)$ may be introduced to represent an amount of observed anchor wireless transmitters, and a variable $M_i(\leq M)$ may be introduced to represent an amount of observed non-anchor wireless transmitters. Given the above, for an example concurrent estimation technique, amounts of observables and variables may meet an example sufficiency test, expressed by following relationships:

$$3(K+M) \leq \sum_{i=1}^{K} (L_i + M_i) \leq K(L+M) \quad (14)$$

and $$3 \leq (L_i + M_i) \quad (15)$$

Although the example sufficiency test relationships described above may be utilized for example concurrent mobile station position and wireless transmitter location estimation techniques involving range measurements between mobile stations and wireless transmitters, exceptions to the sufficiency considerations mentioned above may occur for situations where mobile station or wireless transmitters support point positioning rather than ranging measurements. For example, if a mobile station receives a signal from an AP with sufficiently high RSSI measurement, it may be assumed that the mobile station is in relative close proximity to the AP, and the AP location may be used as an approximate position of the mobile station. If an uncertainty associated with the approximate position is low enough, measurements from the AP location may be utilized in concurrent mobile station position and wireless transmitter location estimation techniques without introducing the mobile station position as an unknown variable to more easily meet the sufficiency test relationships described above.

As described above, an example concurrent mobile station position and wireless transmitter location estimation technique may include a least squares solution that improves a solution incrementally from a set of initial points, which may be referred to as seed locations. Faster convergence on a solution and more reliable solutions may be gained by improvements in the seed locations. In an aspect, a previously known location of a mobile station may be used as a seed location for that mobile station. In a further aspect, a location associated with a cell identifier from a cellular network may be utilized as a seed location. For non-anchor wireless transmitters, mobile station positions or neighborhood anchor wireless transmitter locations may be utilized as seed positions with randomly generated non-zero offsets, in an aspect. However, these are merely example techniques for selecting seed locations, and the scope of claimed subject matter is not limited in these respects.

In a further aspect, because improved seed locations may lead to faster convergence or a more reliable solution, in cases of large amounts of unknown variables, a large concurrent mobile station position and wireless transmitter location estimation operation may be partitioned into smaller subset solutions so long as individual subset solutions contain sufficient amounts of measurements. Utilizing results from the subset solutions, the original large concurrent mobile station position and wireless transmitter location estimation operation may be calculated more efficiently.

Figure 3:
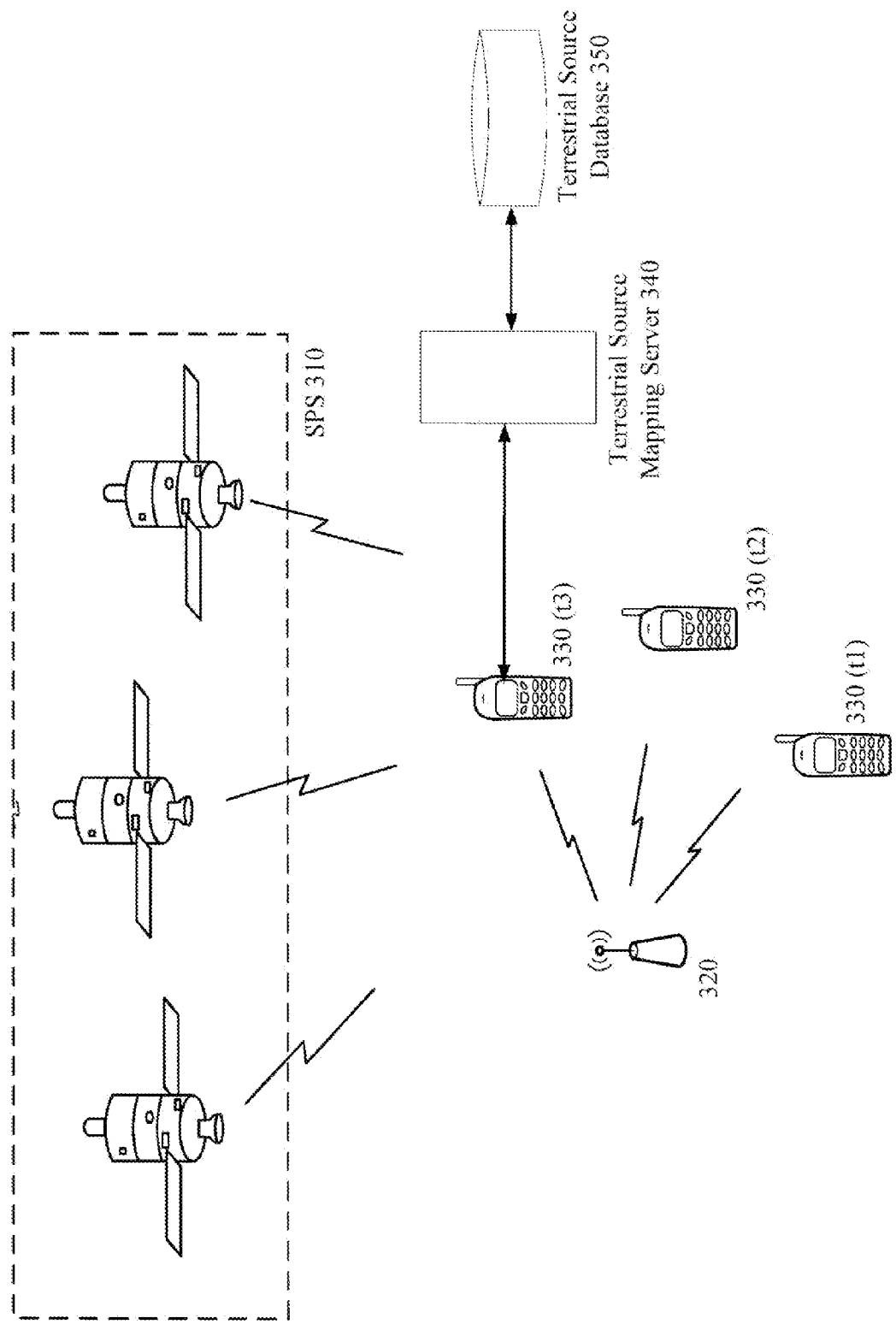
FIG. 3 is a schematic diagram illustrating an example system for autonomous wireless access point mapping.

FIG. 3 is a schematic diagram illustrating an example system for wireless transmitter point mapping. In an aspect, an SPS 310 may comprise a number of space vehicles (SV). For an example, SPS 310 may comprise one or more satellite positioning systems, such as GPS, GLONASS and Galileo, although the scope of claimed subject matter is not limited in this respect. Wireless transmitter 320 may comprise a WiFi access point, although again, the scope of claimed subject matter is not so limited. A mobile station 330 may receive wireless signals from wireless transmitter 330, and may further communicate with a terrestrial source mapping server 340. Server 340 may collect measurement information related to terrestrial wireless transmitters from one or more mobile stations, and may store information related to terrestrial wireless transmitters, such as wireless transmitter 320, in a terrestrial source database 350. For the present example, wireless transmitter 320 may comprise a non-anchor transmitter whose location is to be determined. Mobile station 330 may determine a location for wireless transmitter 320 with or without assistance from a terrestrial source mapping server 340, in an aspect. For example, mobile station 330 may receive signals from wireless transmitter 320 at various points in time.

For the example depicted in FIG. 3, mobile station 330 may take measurements from signals received from wireless transmitter 320 at three individual points in time, labeled t1, t2, and t3. In an aspect, mobile station 330 may further receive wireless signals from SPS 310. The SVs of SPS 310 may comprise anchor wireless transmitters, and measurements taken from wireless signals received from SPS 310 may provide measurements enabling concurrent estimates of positions for mobile station 330 at points in time t1, t2, and t3 and a location for wireless transmitter 320. In an aspect, the concurrent estimation may be accomplished by mobile station 330 without assistance from terrestrial wireless server 340. In a further aspect, mobile station 330 may communicate measurement information to terrestrial source mapping server 340, and the concurrent estimation process may be performed by server 340. Estimated positions for mobile station 330 and an estimated location for wireless transmitter 320 may be communicated from terrestrial source mapping server 340 to mobile station 330, in a further aspect. A system for mapping non-anchor wireless transmitters wherein a mobile station performs wireless transmitter location estimation without assistance from a server may be referred to as an autonomous mapping system.

Figure 4:
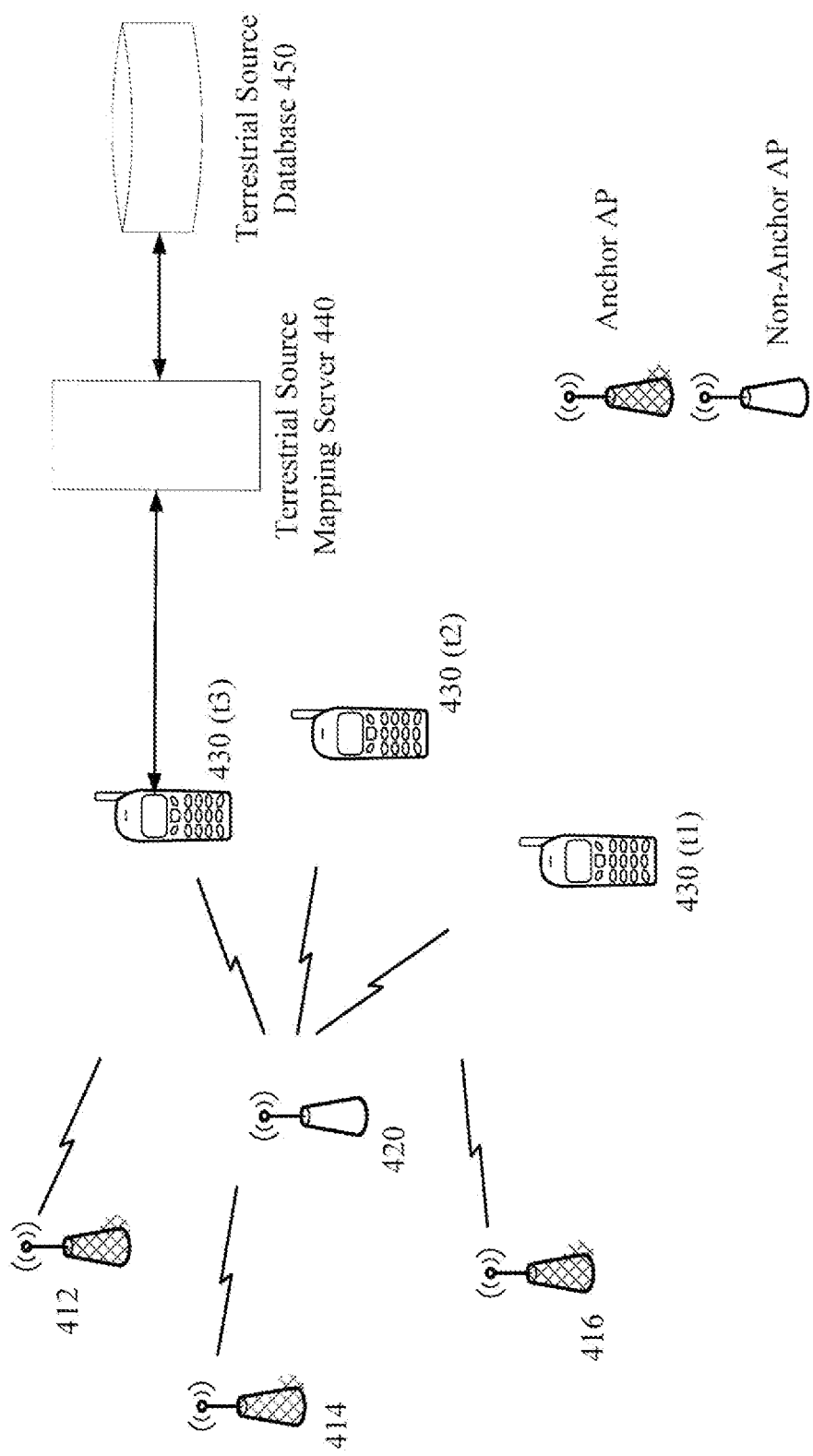
FIG. 4 is a schematic diagram illustrating an example system for semi-autonomous wireless access point mapping.

FIG. 4 is a schematic diagram illustrating an example system for semi-autonomous wireless access point mapping. For an example semi-autonomous mapping system, a mobile station may map non-anchor wireless transmitters based at least in part on information provided by a server. For the example depicted in FIG. 4, mobile station 430 may map non-anchor wireless transmitter 420 by performing location estimation operations based at least in part on information provided by terrestrial source mapping server 440. A terrestrial source database 450 may have stored therein information associated with anchor wireless transmitters 412, 414, and 416, and terrestrial source mapping server 440 may provide such information to mobile station 430. Mobile station 430 may map wireless transmitter 420 based at least in part on the information provided by server 440. Additionally, at least in part in response estimating a location for wireless transmitter 420, mobile station 430 may transmit the location to terrestrial source mapping server 440 to be stored in terrestrial source database 450, and for later use by other mobile stations or in further mapping operations.

In an aspect, mobile station 430 may utilize a concurrent mobile station position and wireless transmitter location estimation process such as an example process described above to map non-anchor wireless transmitter 420. As part of the concurrent estimation process, mobile station 430 may take measurements from signals received from wireless transmitters 420, 412, 414, or 416 at three individual points in time, labeled t1, t2, and t3. Measurements taken by mobile station 430 may be utilized in a least squares solution such as example least squares operations described above to estimate positions for mobile station 430 at points in time t1, t2, and t3, and to estimate a location for wireless transmitter 420.

Figure 5:
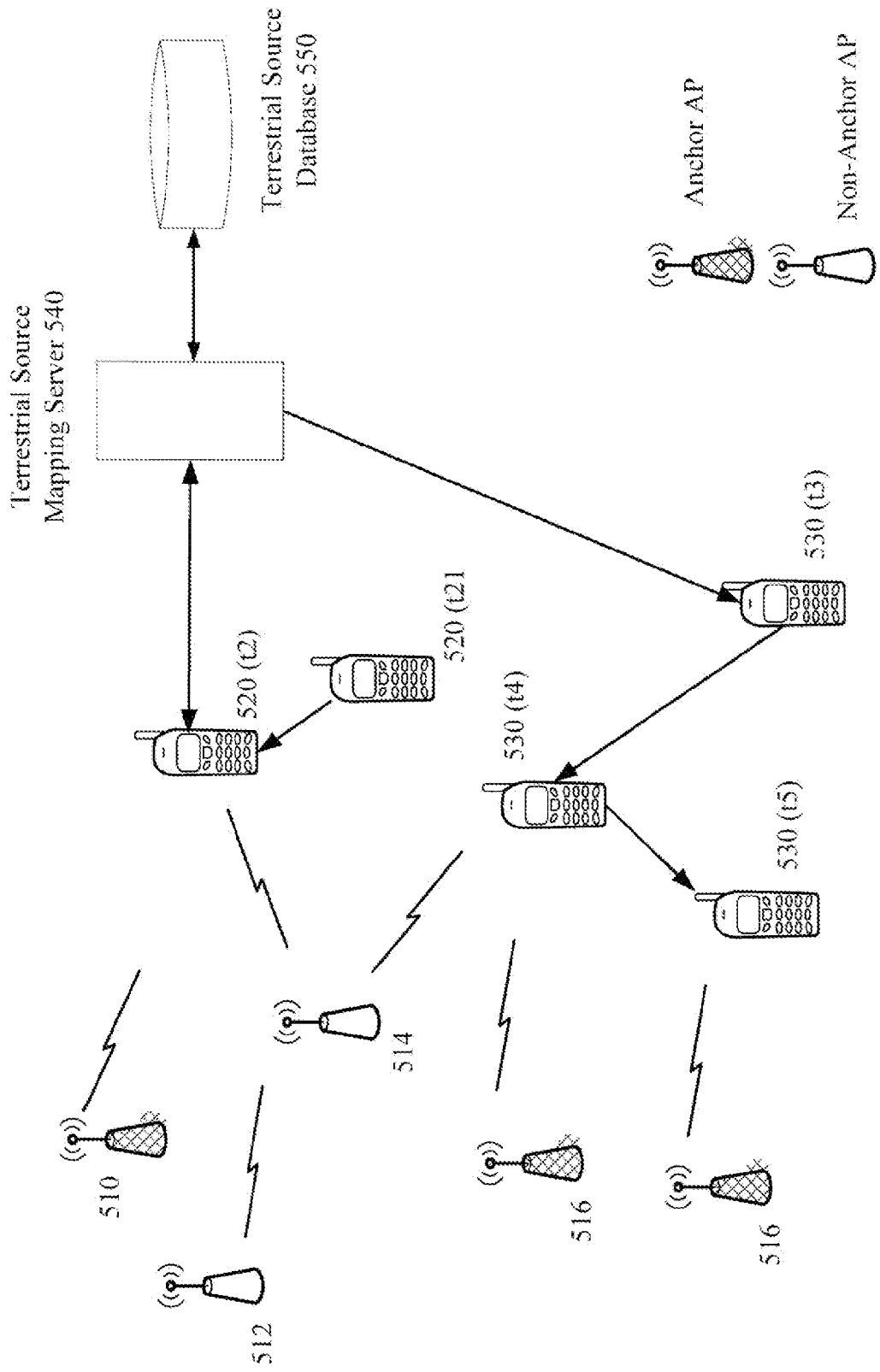
FIG. 5 is a schematic diagram illustrating an example system for multi-user wireless access point mapping.

FIG. 5 is a schematic diagram illustrating an example system for multi-user mapping. For an example multi-user mapping mode, a server may collect range measurement information from multiple mobile stations to estimate mobile station positions and to map wireless transmitters. Because terrestrial wireless transmitters tend to be stationary, a server may aggregate measurements taken by multiple mobile stations from wireless signals received from multiple wireless transmitters over time. A server may sort measurement information according to wireless transmitter source or mobile station positions. At least in part in response to a sufficient amount of measurements being collected, a server may formulate a least squares solution and thereby map a corresponding set of wireless transmitters. Mapped wireless transmitters may serve as anchor points for future mapping operations. Additionally, as further measurements are gathered, estimated locations for wireless transmitters may be made more accurate.

For the example system of FIG. 5, a mobile station 520 may receive wireless signals from wireless transmitters 510, 512, and 514 at points in time t1 and t2, and may take range measurements based at least in part on the received wireless signals. For the example depicted in FIG. 5, wireless transmitter 510 may comprise an anchor access point, and wireless transmitters 512 and 514 may comprise non-anchor access points. Further, for the example depicted in FIG. 5, a mobile station 530 may receive wireless signals from wireless transmitters 514, 516, and 518 at points in time t3, t4, and t5, and may take range measurements based at least in part on the received wireless signals. As noted previously, wireless transmitter 514 may comprise a non-anchor access point. Wireless transmitters 516 and 518 may comprise anchor access points, for an example.

Mobile stations 520 and 530 may provide measurement information related to signals received from wireless transmitters 510, 512, 514, 516, and 518 to a terrestrial source mapping server 540, and the information may be stored in a terrestrial source database 550. In a further aspect, terrestrial source mapping server 540 may utilize a concurrent mobile station position and wireless transmitter location estimation process such as an example process described above to map non-anchor wireless transmitters 512 and 514, to estimate positions for mobile station 520 at points t1 and t2, and to estimate positions for mobile station 530 at points in time t3, t4, and t5, provided sufficient range measurements are available. For mobile stations or non-anchor wireless transmitters without sufficient range measurements, measurements may be stored in database 550 for future estimation operations that may be conducted at least in part in response to additional measurements becoming available. In an example multi-user mapping system, server 540 may collect range measurement information from multiple mobile stations, and may store the range measurement information in database 550. Server 540 may further perform concurrent estimations of mobile station positions and wireless transmitter locations, and may communicate at least some estimated locations to one or more mobile stations. Estimated mobile station positions or wireless transmitter locations may further be stored in database 550, in an aspect.

Figure 6:
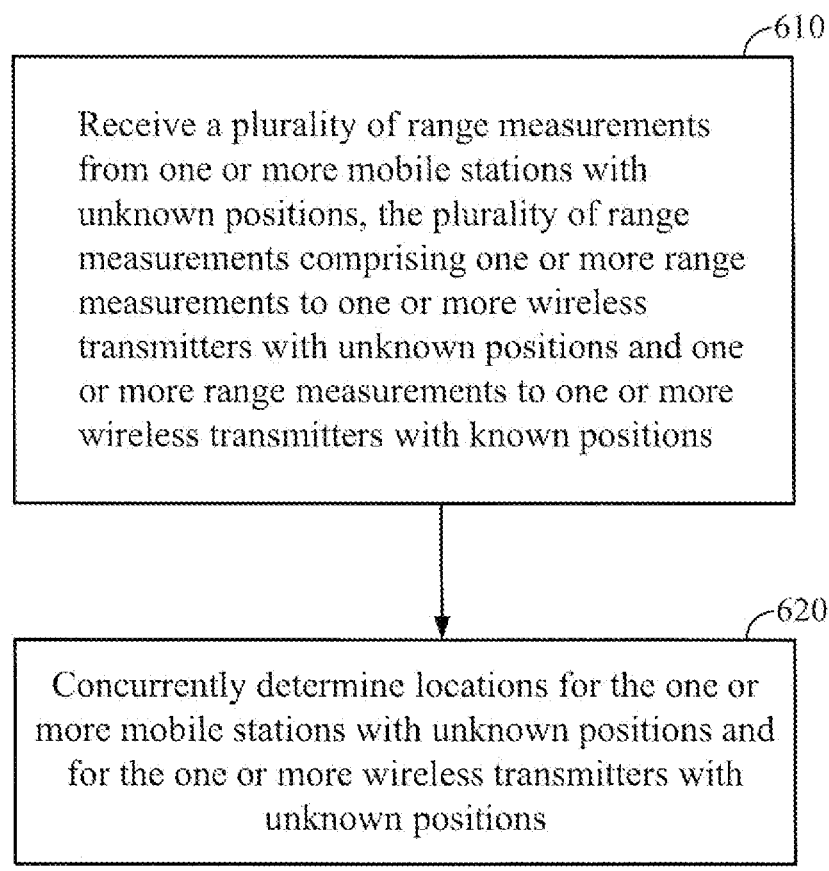
FIG. 6 is a flow diagram of an example process for concurrent wireless access point mapping and mobile station positioning.

FIG. 6 is a flow diagram of an example process for concurrent wireless access point mapping and mobile station positioning. At block 610, a plurality of range measurements may be received from one or more mobile stations without substantially known positions. The plurality of range measurements may comprise one or more range measurements to one or more wireless transmitters without substantially known positions and one or more range measurements to one or more wireless transmitters with substantially known positions. At block 620, locations for the one or more mobile stations and for the one or more wireless transmitters without substantially known positions may be concurrently determined. Examples in accordance with claimed subject matter may comprise all of blocks 610 and 620, less than blocks 610 and 620, or more than blocks 610 and 620. Similarly, the order of blocks 610 and 620 is merely an example order.

Figure 7:
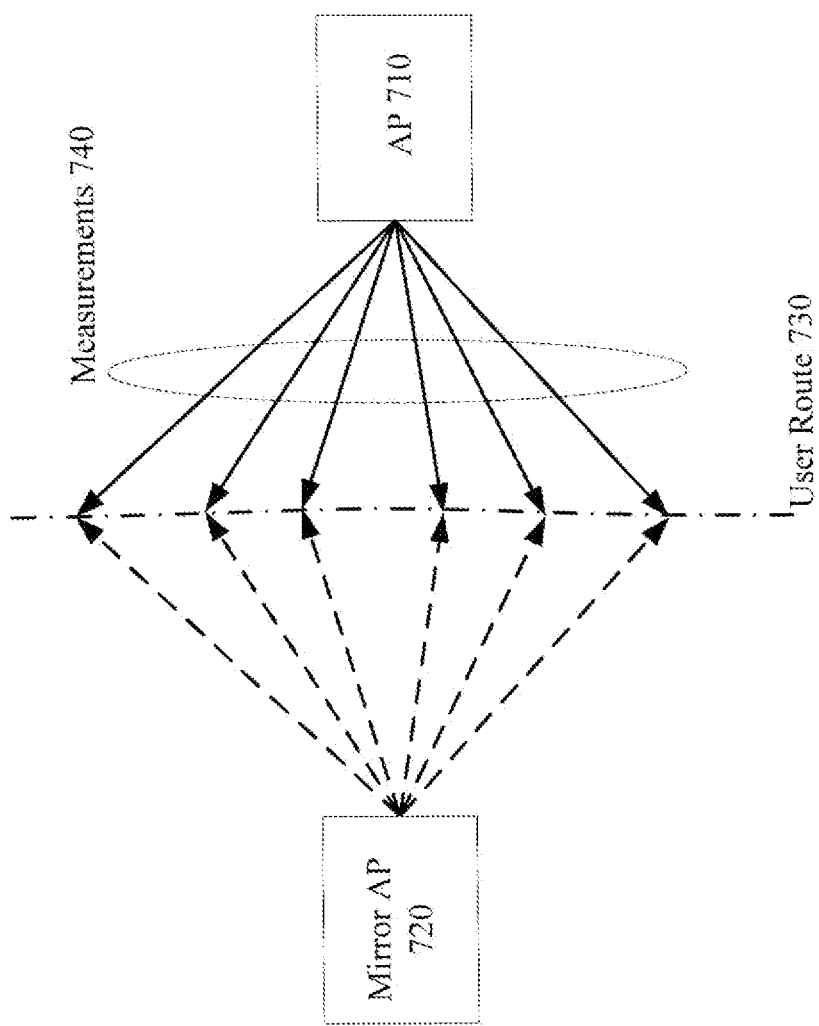
FIG. 7 is a schematic block diagram illustrating an example mirroring effect.

FIG. 7 is a schematic block diagram illustrating an example mirroring effect. Mirroring effects refer to situations where two equally likely position fixes exist on either side of a mobile station trajectory in the case of substantially collinear mobile station trajectory. As illustrated in FIG. 7, a mobile station may move along a user route 730 and may receive signals from an AP 710 at different locations. In such a situation, the number of range measurements 740 available should be sufficient to map this AP. However, depending on seed location, such a mapping may result in a true location for AP 710 or may result in a mirror location 720. This circumstance may exist because AP 710 location and Mirror AP 720 location individually satisfy range relationships from the mobile station. In other words, a mirroring effect may result in relatively large outliers in estimation. This may be particularly true if a user of a mobile station travels in a substantially straight line.

Figure 8:
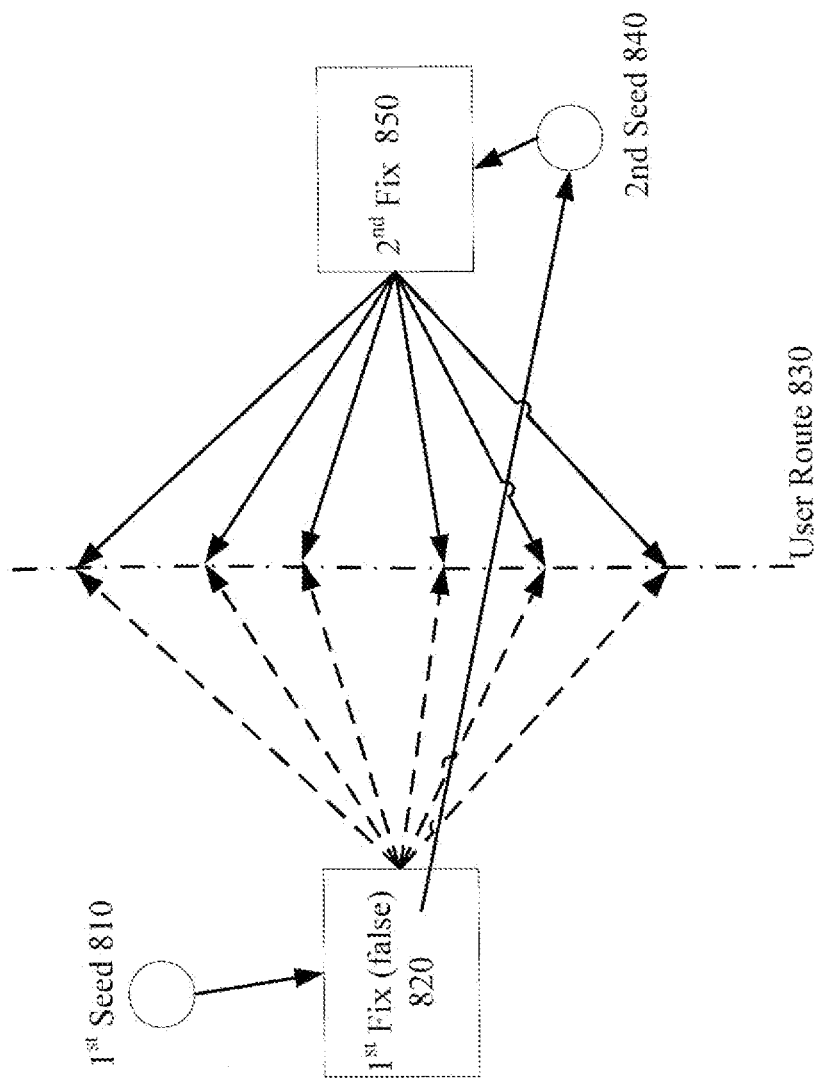
FIG. 8 is a schematic block diagram illustrating an example process for mirror effect detection by multi-seeded positioning.

FIG. 8 is a schematic block diagram illustrating an example process for mirror effect detection by multi-seeded positioning. In an aspect, multiple seed positions may be tried, and various positron fixes based on tried seed positions may be compared. For example, a first position fix may be generated based at least in part on a first seed position 810. A mirror point of the first position fix 820 may be generated, and the mirror point may be utilized as a second seed position 840. A second position fix 850 may be determined based at least in part on second seed position 840. In a further aspect, first position fix 820 and second position fix 850 may be compared to determine a correct position fix, or to declare a mirror effect. In the event a mirror effect is discovered, mirrored position fixes may be stored in a database so that the position fixes may be revisited if additional range measurements become available.

Figure 9:
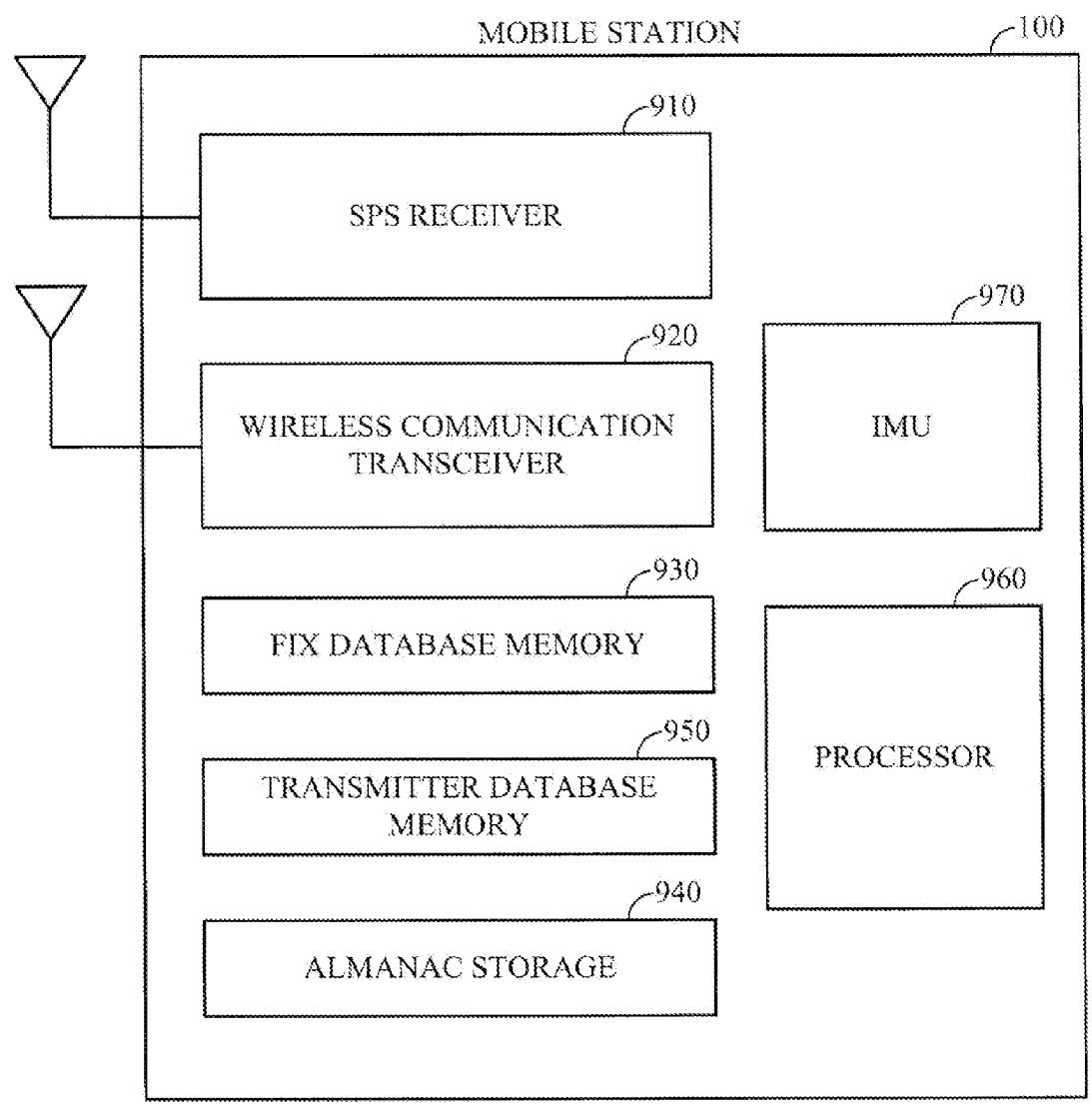
FIG. 9 is a schematic block diagram of an example embodiment of a mobile station.

FIG. 9 is a schematic block diagram of an example implementation of mobile station 100. In an aspect, mobile station 100 comprises an SPS receiver 910 and a wireless communication transceiver 920. Thus, mobile station 100 may communicate with one or more SPS such as SPS 310 and one or more terrestrial wireless networks, such as a WiFi network, in an aspect. In another aspect, mobile station 100 may further comprise a memory device that is partitioned, in one example, to store position fix information in fix database memory 930, to store transmitter information in a transmitter database memory 950, and to store base station almanac information in a base station almanac storage area 940.

In a further aspect, mobile station 100 may comprise one or more sensors that for this example are incorporated into Inertial Measurement Unit (IMU) 970 that may be utilized in dead-reckoning navigation operations, for example. Example sensors that may be incorporated into IMU 970 or elsewhere in mobile station 100 may include one or more of an accelerometer, a gyroscope, a compass, thermometer, or a magnetometer, for example. However, claimed subject matter is not limited in this respect. Mobile station 100 further comprises processor 960, for this example. Of course, this is merely one example of a configuration of a mobile station, and the scope of claimed subject matter is not limited in this respect.

In an aspect, location information for a plurality of wireless transmitters may be stored in a network entity such as almanac server 150 in wireless communication network 130, or may be stored in any of a wide range of other resources in the wireless network. Further, for an example, location information for wireless transmitters may comprise longitude and latitude, and may for another example also comprise altitude information. However, these are merely examples of location information for wireless transmitters, and the scope of claimed subject matter is not limited in this respect.

Figure 10:
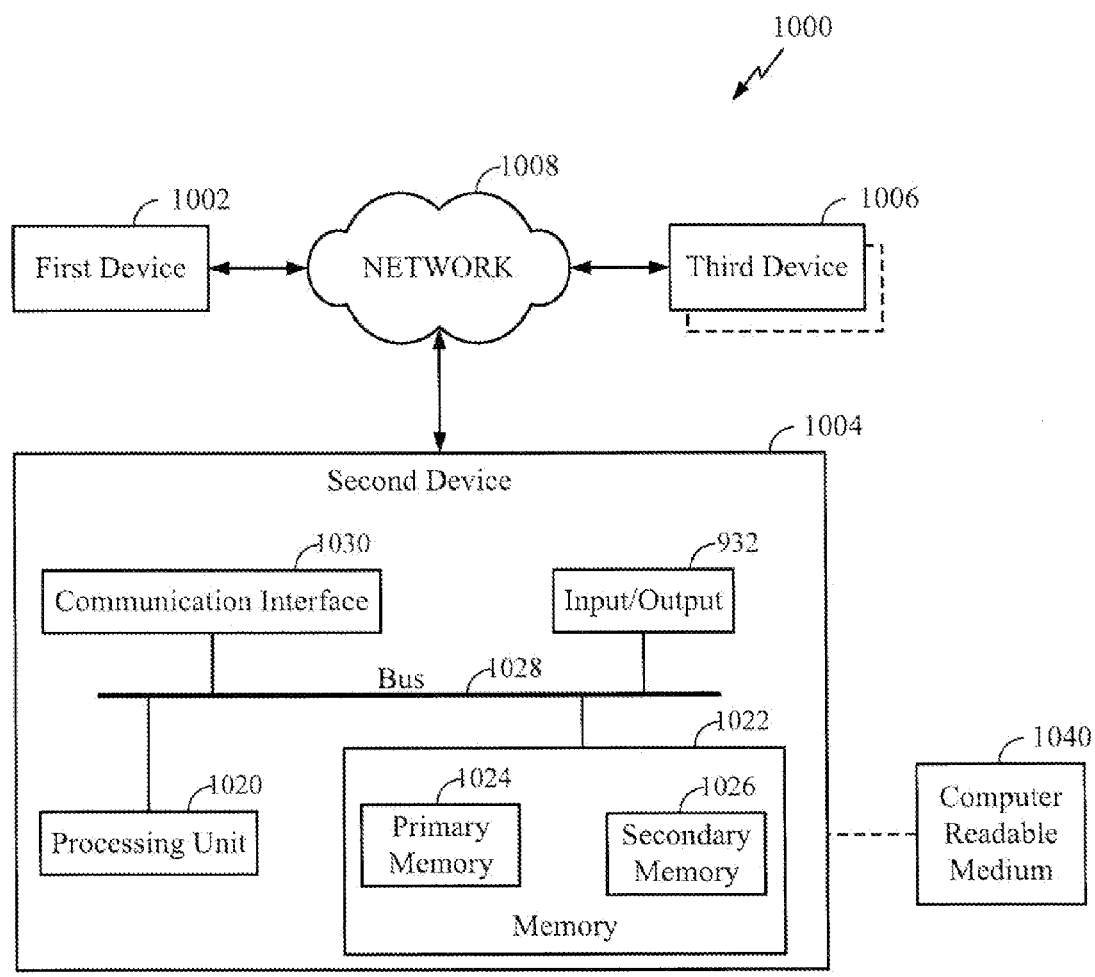
FIG. 10 is a schematic block diagram depicting an example embodiment of a computing platform.

FIG. 10 is a schematic diagram illustrating an example computing and communications environment 1000 that may include one or more devices configurable to implement techniques or processes described above, for example, in connection with example techniques for concurrent wireless transmitter mapping and mobile station positioning, depicted in FIGS. 1-8. System 1000 may include, for example, a first device 1002, a second device 1004, and a third device 1006, which may be operatively coupled together through a network 1008.

First device 1002, second device 1004 and third device 1006, as shown in FIG. 10, may be representative of any device, appliance or machine that may be configurable to exchange data over wireless communications network 1008. By way of example but not limitation, any of first device 1002, second device 1004, or third device 1006 may include: one or more computing devices or platforms, such as, e.g., a desktop computer, a laptop computer, a workstation, a server device, or the like; one or more personal computing or communication devices or appliances, such as, e.g., a personal digital assistant, mobile communication device, or the like; a computing system or associated service provider capability, such as, e.g., a database or data storage service provider/system, a network service provider/system, an Internet or intranet service provider/system, a portal or search engine service provider/system, a wireless communication service provider/system; or any combination thereof. Any of the first, second, and third devices 1002, 1004, or 1006, respectively, may comprise one or more of an almanac server, an access point, or a mobile station in accordance with the examples described herein.

Similarly, network 1008, as shown in FIG. 10, is representative of one or more communication links, processes, or resources configurable to support the exchange of data between at least two of first device 1002, second device 1004, and third device 1006. By way of example but not limitation, network 1008 may include wireless or wired communication links, telephone or telecommunications systems, data buses or channels, optical fibers, terrestrial or space vehicle resources, local area networks, wide area networks, intranets, the Internet, routers or switches, and the like, or any combination thereof. As illustrated, for example, by the dashed lined box illustrated as being partially obscured of third device 1006, there may be additional like devices operatively coupled to network 1008.

It is recognized that all or part of the various devices and networks shown in system 1000, and the processes and methods as further described herein, may be implemented using or otherwise including hardware, firmware, software, or any combination thereof.

Thus, by way of example but not limitation, second device 1004 may include at least one processing unit 1020 that is operatively coupled to a memory 1022 through a bus 1028.

Processing unit 1020 is representative of one or more circuits configurable to perform at least a portion of a data computing procedure or process. By way of example but not limitation, processing unit 1020 may include one or more processors, controllers, microprocessors, microcontrollers, application specific integrated circuits, digital signal processors, programmable logic devices, field programmable gate arrays, and the like, or any combination thereof.

Memory 1022 is representative of any data storage mechanism. Memory 1022 may include, for example, a primary memory 1024 or a secondary memory 1026. Primary memory 1024 may include, for example, a random access memory, read only memory, etc. While illustrated in this example as being separate from processing unit 1020, it should be understood that all or part of primary memory 1024 may be provided within or otherwise co-located/coupled with processing unit 1020.

Secondary memory 1026 may include, for example, the same or similar type of memory as primary memory or one or more data storage devices or systems, such as, for example, a disk drive, an optical disc drive, a tape drive, a solid state memory drive, etc. In certain implementations, secondary memory 1026 may be operatively receptive of, or otherwise configurable to couple to, a computer-readable medium 1040. Computer-readable medium 1040 may include, for example, any medium that can carry or make accessible data, code or instructions for one or more of the devices in system 1000. Computer readable medium 1040 may also be referred to as a storage medium.

Second device 1004 may include, for example, a communication interface 1030 that provides for or otherwise supports the operative coupling of second device 1004 to at least network 1008. By way of example but not limitation, communication interface 1030 may include a network interface device or card, a modem, a router, a switch, a transceiver, and the like.

Second device 1004 may include, for example, an input/output 1032. Input/output 1032 is representative of one or more devices or features that may be configurable to accept or otherwise introduce human or machine inputs, or one or more devices or features that may be configurable to deliver or otherwise provide for human or machine outputs. By way of example but not limitation, input/output device 1032 may include an operatively configured display, speaker, keyboard, mouse, trackball, touch screen, data port, etc.

The methodologies described herein may be implemented by various means depending upon applications according to particular examples. For example, such methodologies may be implemented in hardware, firmware, software, or combinations thereof. In a hardware implementation, for example, a processing unit may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other devices units designed to perform the functions described herein, or combinations thereof.

"Instructions" as referred to herein relate to expressions which represent one or more logical operations. For example, instructions may be "machine-readable" by being interpretable by a machine for executing one or more operations on one or more data objects. However, this is merely an example of instructions and claimed subject matter is not limited in this respect. In another example, instructions as referred to herein may relate to encoded commands which are executable by a processing circuit having a command set which includes the encoded commands. Such an instruction may be encoded in the form of a machine language understood by the processing circuit. Again, these are merely examples of an instruction and claimed subject matter is not limited in this respect.

"Storage medium" as referred to herein relates to media capable of maintaining expressions which are perceivable by one or more machines. For example, a storage medium may comprise one or more storage devices for storing machine-readable instructions or information. Such storage devices may comprise any one of several media types including, for example, magnetic, optical or semiconductor storage media. Such storage devices may also comprise any type of long term, short term, volatile or non-volatile memory devices. However, these are merely examples of a storage medium, and claimed subject matter is not limited in these respects.

Some portions of the detailed description included herein are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular operations pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Wireless communication techniques described herein may be in connection with various wireless communication networks such as a wireless wide area network (WWAN), a wireless local area network (WLAN), a wireless personal area network (WPAN), and so on. The term "network" and "system" may be used interchangeably herein. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, or any combination of the above networks, and so on. A CDMA network may implement one or more radio access technologies (RATs) such as cdma2000, Wideband-CDMA (W-CDMA), to name just a few radio technologies. Here, cdma2000 may include technologies implemented according to IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may comprise an IEEE 802.11x network, and a WPAN may comprise a Bluetooth network, an IEEE 802.15x, for example. Wireless communication implementations described herein may also be used in connection with any combination of WWAN, WLAN or WPAN. Further, wireless communications described herein may comprise wireless communications performed in compliance with a 4G wireless communication protocol.

The terms, "and," and "or" as used herein may include a variety of meanings that will depend at least in part upon the context in which it is used. Typically, "or" if used to associate a list, such as A, B or C, is intended to mean A, B, and C, here used in the inclusive sense, as well as A, B or C, here used in the exclusive sense. Reference throughout this specification to "one example" or "an example" means that a particular feature, structure, or characteristic described in connection with the example is included in at least one example of claimed subject matter. Thus, the appearances of the phrase "in one example" or "an example" in various places throughout this specification are not necessarily all referring to the same example. Furthermore, the particular features, structures, or characteristics may be combined in one or more examples. Examples described herein may include machines, devices, engines, or apparatuses that operate using digital signals. Such signals may comprise electronic signals, optical signals, electromagnetic signals, or any form of energy that provides information between locations.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter may also include all aspects falling within the scope of the appended claims, and equivalents thereof.

The invention claimed is:

1. A method comprising:
   receiving at a computing platform a plurality of range measurements from one or more mobile stations with unknown positions, the plurality of range measurements comprising one or more range measurements to one or more wireless transmitters with unknown positions and one or more range measurements to one or more wireless transmitters with known positions; and
   estimating locations for the one or more mobile stations with unknown positions and locations for the one or more wireless transmitters with unknown positions, by at least inverting a matrix;

wherein the matrix is based at least in part on geometric relationships of locations of the one or more mobile stations and the one or more wireless transmitters with unknown and known positions.

2. The method of claim 1 wherein said estimating comprises:
utilizing a least squares operation.

3. The method of claim 1 further comprising:
calculating a plurality of range estimates based at least in part on a plurality of updated seed locations; and
calculating differences between the plurality of range estimates and the plurality of range measurements.

4. The method of claim 1 further comprising:
detecting mirror effect by trying multiple seed locations and by comparing position fixes based on tried seed locations.

5. The method of claim 4 further comprising:
storing information associated with one or more mirrored position fixes in a database at least in part in response to a detection of one or more mirror effects; and
revisiting one or more of the one or more mirrored position fixes at least in part in response to an availability of additional range measurement information.

6. The method of claim 1 wherein the one or more wireless transmitters with known positions comprises one or more of a wireless access point or a femtocell, and wherein the one or more wireless transmitters with unknown positions also comprises one or more of a wireless access point or a femtocell.

7. The method of claim 1 wherein said receiving the plurality of range measurements from the one or more mobile stations with unknown positions comprises receiving the plurality of range measurements from a plurality of mobile stations with unknown positions.

8. The method of claim 1 wherein said receiving the plurality of range measurements from the one or more mobile stations with unknown positions comprises receiving the plurality of range measurements at a respective plurality of points in time from one mobile station with an unknown position.

9. The method of claim 1 wherein said receiving the plurality of range measurements comprises receiving one or more of a time of arrival, a time difference of arrival, a round trip time, or a received signal strength indicator.

10. The method of claim 1 wherein said receiving the plurality of range measurements from the one or more mobile stations with unknown positions comprises aggregating said plurality of range measurements from the one or more mobile stations with unknown positions over a period of time.

11. The method of claim 10 wherein said concurrently estimating locations for the one or more mobile stations with unknown positions and for the one or more wireless transmitters with unknown positions comprises refining previous estimations of locations for the one or more wireless transmitters based, at least in part, on aggregated range measurements obtained by the aggregating.

12. A method comprising:
receiving at a computing platform a plurality of range measurements from one or more mobile stations with unknown positions, the plurality of range measurements comprising one or more range measurements to one or more wireless transmitters with unknown positions and one or more range measurements to one or more wireless transmitters with known positions; and
estimating locations for the one or more mobile stations with unknown positions and locations for the one or more wireless transmitters with unknown positions, based at least in part on inverting a matrix;
wherein said estimating is performed using an iterative technique, the iterative technique comprising:
calculating a plurality of range estimates $\rho$ based on a plurality of seed locations x; and
calculating differences $d\rho$ between the plurality of range measurements received at the computing platform and the plurality of range estimates $\rho$.

13. A method comprising:
receiving at a computing platform a plurality of range measurements from one or more mobile stations with unknown positions, the plurality of range measurements comprising one or more range measurements to one or more wireless transmitters with unknown positions and one or more range measurements to one or more wireless transmitters with known positions;
estimating locations for the one or more mobile stations with unknown positions and locations for the one or more wireless transmitters with unknown positions by at least:
calculating a plurality of range estimates $\rho$ based on a plurality of seed locations x;
calculating differences $d\rho$ between the plurality of range measurements received at the computing platform and the plurality of range estimates $\rho$;
calculating updates dx for the plurality of seed locations x based on the differences $d\rho$; and
updating the plurality of seed locations, as x=x+dx.

14. A method comprising:
receiving at a computing platform a plurality of range measurements from one or more mobile stations with unknown positions, the plurality of range measurements comprising one or more range measurements to one or more wireless transmitters with unknown positions and one or more range measurements to one or more wireless transmitters with known positions;
estimating locations for the one or more mobile stations with unknown positions and locations for the one or more wireless transmitters with unknown positions;
calculating a plurality of range estimates based at least in part on a plurality of estimated locations obtained by the estimating;
calculating differences between the plurality of range estimates and the plurality of range measurements;
determining whether the differences between the plurality of range estimates and the plurality of range measurements are less than a specified error threshold; and
utilizing said estimated locations of the one or more mobile stations with unknown positions and of the one or more wireless transmitters with unknown positions as a plurality of updated seed locations at least in part in response to a determination that the differences between the plurality of range estimates and the plurality of range measurements are less than the specified error threshold.

15. An article comprising a non-transitory storage medium having stored thereon instructions executable by a processor of a computing platform to at least:
estimate locations for one or more mobile stations with unknown positions and locations for one or more wireless transmitters with unknown positions, based at least in part on a plurality of range measurements received from the one or more mobile stations with unknown positions, the plurality of range measurements comprising one or more first range measurements to the one or more wireless transmitters with unknown positions and one or more second range measurements to one or more wireless transmitters with known positions, and by at least inverting a matrix;

wherein the matrix is based at least in part on geometric relationships of locations of the one or more mobile stations and the one or more wireless transmitters with unknown and known positions.

16. The article of claim 15 wherein the non-transitory storage medium has stored thereon further instructions executable by the processor to:
utilize a least squares operation.

17. The article of claim 15 wherein the non-transitory storage medium has stored thereon further instructions executable by the processor to at least:
calculate the plurality of range estimates based at least in part on the plurality of updated seed locations; and
calculate differences between the plurality of range estimates and the plurality of range measurements.

18. The article of claim 15 wherein the non-transitory storage medium has stored thereon further instructions executable by the processor to detect mirror effect by trying multiple seed locations and by comparing position fixes based on tried seed locations.

19. The article of claim 18 wherein the non-transitory storage medium has stored thereon further instructions executable by the processor to:
store information associated with one or more mirrored position fixes in a database at least in part in response to a detection of one or more mirror effects; and
revisit one or more of the one or more mirrored position fixes at least in part in response to an availability of additional range measurement information.

20. The article of claim 15 wherein the one or more wireless transmitters with known positions comprises one or more of a wireless access point or a femtocell, and wherein the one or more wireless transmitters with unknown positions also comprises one or more of a wireless access point or a femtocell.

21. The article of claim 15 wherein said plurality of range measurements received from said one or more mobile stations with unknown positions comprises a plurality of range measurements received from a plurality of mobile stations with unknown positions.

22. The article of claim 15 wherein said plurality of range measurements received from the one or more mobile stations with unknown positions comprises a plurality of range measurements taken at a respective plurality of points in time received from a single mobile station with an unknown position.

23. The article of claim 15 wherein said plurality of range measurements comprises one or more of a time of arrival, a time difference of arrival, a round trip time, or a received signal strength indicator.

24. The article of claim 15 wherein said plurality of range measurements from the one or more mobile stations with unknown positions comprises an aggregate of said plurality of range measurements taken from the one or more mobile stations with unknown positions over a period of time.

25. The article of claim 24 wherein the non-transitory storage medium has stored thereon further instructions executable by the processor to concurrently estimate locations of the one or more mobile stations with unknown positions and of the one or more wireless transmitters with unknown positions at least in part by refining previous estimations of locations for the one or more wireless transmitters with unknown positions based, at least in part, on aggregate of range measurements obtained by execution of the instructions to aggregate.

26. An article comprising a non-transitory storage medium having stored thereon instructions executable by a processor of a computing platform to at least:
estimate locations for one or more mobile stations with unknown positions and locations for one or more wireless transmitters with unknown positions, based at least in part on a plurality of range measurements received from the one or more mobile stations with unknown positions, the plurality of range measurements comprising one or more first range measurements to the one or more wireless transmitters with unknown positions and one or more second range measurements to one or more wireless transmitters with known positions, and based at least in part on inverting a matrix;
wherein the instructions stored on the non-transitory storage media comprise instructions to use an iterative technique, the instructions to use the iterative technique comprising instructions to:
calculate a plurality of range estimates $\rho$ based on a plurality of seed locations x; and
calculate differences $d\rho$ between the plurality of range measurements received at the computing platform and the plurality of range estimates $\rho$.

27. An article comprising a non-transitory storage medium having stored thereon instructions executable by a processor of a computing platform, the instructions comprising:
instructions to estimate locations for one or more mobile stations with unknown positions and locations for one or more wireless transmitters with unknown positions, based at least in part on a plurality of range measurements received from the one or more mobile stations with unknown positions, the plurality of range measurements comprising one or more first range measurements to the one or more wireless transmitters with unknown positions and one or more second range measurements to one or more wireless transmitters with known positions;
wherein the instructions to estimate comprise:
instructions to calculate a plurality of range estimates $\rho$ based on a plurality of seed locations x;
instructions to calculate differences $d\rho$ between the plurality of range measurements received at the computing platform and the plurality of range estimates $\rho$;
instructions to calculate updates dx for the plurality of seed locations x based on the differences $d\rho$; and
instructions to update the plurality of seed locations, as x=x+dx.

28. An article comprising a non-transitory storage medium having stored thereon instructions executable by a processor of a computing platform, the instructions comprising:
instructions to estimate locations for one or more mobile stations with unknown positions and locations for one or more wireless transmitters with unknown positions, based at least in part on a plurality of range measurements received from the one or more mobile stations with unknown positions, the plurality of range measurements comprising one or more first range measurements to the one or more wireless transmitters with unknown positions and one or more second range measurements to one or more wireless transmitters with known positions;
instructions to calculate a plurality of range estimates based at least in part on a plurality of estimated locations obtained by execution of the instructions to estimate;
instructions to calculate differences between the plurality of range estimates and the plurality of range measurements;

instructions to determine whether the differences between the plurality of range estimates and the plurality of range measurements are less than a specified error threshold; and instructions to utilize said estimated locations of the one or more mobile stations with unknown positions and of the one or more wireless transmitters with unknown positions as a plurality of updated seed locations at least in part in response to a determination that the differences between the plurality of range estimates and the plurality of range measurements are less than the specified error threshold.

29. A computing platform comprising:

a communication interface configured to receive a plurality of range measurements from one or more mobile stations with unknown positions, the plurality of range measurements comprising one or more first range measurements to one or more wireless transmitters with unknown positions and one or more second range measurements to one or more wireless transmitters with known positions; and at least one processor configured to estimate locations of the one or more mobile stations with unknown positions and locations of the one or more wireless transmitters with unknown positions, by at least inverting a matrix;

wherein the matrix is based at least in part on geometric relationships of locations of the one or more mobile stations and the one or more wireless transmitters with unknown and known positions.

30. The computing platform of claim 29 wherein the at least one processor is further configured to:

utilize a least squares operation.

31. The computing platform of claim 29 wherein the at least one processor is further configured to:

calculate the plurality of range estimates based at least in part on the plurality of updated seed locations; and calculate differences between the plurality of range estimates and the plurality of range measurements.

32. The computing platform of claim 29 wherein the processor is configured to detect mirror effect by trying multiple seed locations and by comparing position fixes based on tried seed locations.

33. The computing platform of claim 32 further comprising:

a memory;

wherein the processor is configured to store in the memory information associated with one or more mirrored position fixes at least in part in response to a detection of one or more mirror effects, and wherein the processor is configured to revisit one or more of the one or more mirrored position fixes at least in part in response to an availability of additional range measurement information.

34. The computing platform of claim 29 wherein the one or more wireless transmitters with known positions comprises one or more of a wireless access point or a femtocell, and wherein the one or more wireless transmitters with unknown positions also comprises one or more of a wireless access point or a femtocell.

35. The computing platform of claim 29 wherein the communication interface is configured to receive the plurality of range measurements from the one or more mobile stations with unknown positions by receiving the plurality of range measurements from a plurality of mobile stations with unknown positions.

36. The computing platform of claim 29 wherein the communication interface is configured to receive the plurality of range measurements from the one or more mobile stations with unknown positions by receiving the plurality of range measurements at a respective plurality of points in time from one mobile station with an unknown position.

37. The computing platform of claim 29 wherein the communication interface is configured to receive the plurality of range measurements at least in part by receiving one or more of a time of arrival, a time difference of arrival, a round trip time, or a received signal strength indicator.

38. The computing platform of claim 29 wherein the communication interface is configured to receive the plurality of range measurements from the one or more mobile stations with unknown positions at least in part by aggregating said plurality of range measurements from the one or more mobile stations with unknown positions over a period of time.

39. The computing platform of claim 38 wherein the processor is configured to concurrently estimate locations for the one or more mobile stations with unknown positions and for the one or more wireless transmitters with unknown positions at least in part by refining previous estimations of locations for the one or more wireless transmitters with unknown positions based, at least in part, on said aggregated range measurements.

40. The apparatus of claim 39 wherein the one or more wireless transmitters with known positions comprises one or more of a wireless access point or a femtocell and wherein the one or more wireless transmitters with unknown positions also comprises one or more of a wireless access point or a femtocell.

41. The apparatus of claim 39 wherein said means for receiving the plurality of range measurements from the one or more mobile stations with unknown positions comprises means for receiving the plurality of range measurements from a plurality of mobile stations with unknown positions.

42. The apparatus of claim 39 wherein said means for receiving the plurality of range measurements from the one or more mobile stations with unknown positions comprises means for receiving the plurality of range measurements at a respective plurality of points in time from one mobile station with a known position.

43. The apparatus of claim 39 wherein said means for receiving the plurality of range measurements comprises means for receiving one or more of a time of arrival, a time difference of arrival, a round trip time, or a received signal strength indicator.

44. The apparatus of claim 39 wherein said means for receiving the plurality of range measurements from the one or more mobile stations with unknown positions comprises means for aggregating said plurality of range measurements from the one or more mobile stations with unknown positions over a period of time.

45. The apparatus of claim 44 wherein said means for concurrently estimating locations for the one or more mobile stations with unknown positions and for the one or more wireless transmitters with unknown positions comprises means for refining previous estimations of locations for the one or more wireless transmitters based, at least in part, on aggregated range measurements obtained by the means for aggregating.

46. A computing platform comprising:

a communication interface to receive a plurality of range measurements from one or more mobile stations with unknown positions, the plurality of range measurements comprising one or more first range measurements to one or more wireless transmitters with unknown positions and one or more second range measurements to one or more wireless transmitters with known positions; and at least one processor to estimate locations of the one or more mobile stations with unknown positions and locations of the one or more wireless transmitters with unknown positions, based at least in part on inverting a matrix;
wherein the processor is configured to estimate said locations using an iterative technique to at least:
calculate a plurality of range estimates ρ based on a plurality of seed locations x; and
calculate differences dρ between the plurality of range measurements received at the computing platform and the plurality of range estimates ρ.

47. A computing platform comprising:
a communication interface to receive a plurality of range measurements from one or more mobile stations with unknown positions, the plurality of range measurements comprising one or more range measurements to one or more wireless transmitters with unknown positions and one or more range measurements to one or more wireless transmitters with known positions; and
at least one processor to estimate locations of the one or more mobile stations with unknown positions and locations of the one or more wireless transmitters with unknown positions, wherein the processor is configured to at least:
calculate a plurality of range estimates ρ based on a plurality of seed locations x;
calculate differences dρ between the plurality of range measurements received at the computing platform and the plurality of range estimates ρ;
calculate updates dx for the plurality of seed locations x based on the differences dρ; and
update the plurality of seed locations, as x=x+dx.

48. A computing platform comprising:
a communication interface to receive a plurality of range measurements from one or more mobile stations with unknown positions, the plurality of range measurements comprising one or more range measurements to one or more wireless transmitters with unknown positions and one or more range measurements to one or more wireless transmitters with known positions; and
at least one processor to estimate locations of the one or more mobile stations with unknown positions and locations of the one or more wireless transmitters with unknown positions, wherein the processor is configured to at least:
calculate a plurality of range estimates based at least in part on a plurality of estimated locations obtained by the estimating;
calculate differences between the plurality of range estimates and the plurality of range measurements;
determine whether the differences between the plurality of range estimates and the plurality of range measurements are less than a specified error threshold; and
utilize said estimated locations of the one or more mobile stations with unknown positions and of the one or more wireless transmitters with unknown positions as a plurality of updated seed locations at least in part in response to a determination that the differences between the plurality of range estimates and the plurality of range measurements are less than the specified error threshold.

49. An apparatus comprising:
means for receiving a plurality of range measurements from one or more mobile stations with unknown positions, the plurality of range measurements comprising one or more first range measurements to one or more wireless transmitters with unknown positions and one or more second range measurements to one or more wireless transmitters with known positions; and
means for estimating locations of the one or more mobile stations with unknown positions and locations for the one or more wireless transmitters with unknown positions utilizing, at least in part, a processor of a computing platform, and by at least inverting a matrix;
wherein the matrix is based at least in part on geometric relationships of locations of the one or more mobile stations and the one or more wireless transmitters with unknown and known positions.

50. The apparatus of claim 49 further comprising:
means for utilizing a least squares operation.

51. The apparatus of claim 49 further comprising:
means for calculating the plurality of range estimates based at least in part on the plurality of updated seed locations; and
means for calculating differences between the plurality of range estimates and the plurality of range measurements.

52. The apparatus of claim 49 further comprising:
means for detecting mirror effect by trying multiple seed locations and by comparing position fixes based on tried seed locations.

53. The apparatus of claim 52 further comprising:
means for storing information associated with one or more mirrored position fixes at least in part in response to a detection of one or more mirror effects; and
means for revisiting one or more of the one or more mirrored position fixes at least in part in response to an availability of additional range measurement information.

54. An apparatus comprising:
means for receiving a plurality of range measurements from one or more mobile stations with unknown positions, the plurality of range measurements comprising one or more range measurements to one or more wireless transmitters with unknown positions and one or more range measurements to one or more wireless transmitters with known positions; and
means for estimating locations of the one or more mobile stations with unknown positions and locations for the one or more wireless transmitters with unknown positions utilizing, at least in part, a processor of a computing platform, and based at least in part on inverting a matrix;
wherein the means for estimating comprise means for using an iterative technique, and the means for using the iterative technique comprising:
means for calculating a plurality of range estimates ρ based on a plurality of seed locations x; and
means for calculating differences dρ between the plurality of range measurements received at the computing platform and the plurality of range estimates ρ.

55. An apparatus comprising:
means for receiving a plurality of range measurements from one or more mobile stations with unknown positions, the plurality of range measurements comprising one or more range measurements to one or more wireless transmitters with unknown positions and one or more range measurements to one or more wireless transmitters with known positions;
means for estimating locations of the one or more mobile stations with unknown positions and locations for the one or more wireless transmitters with unknown positions utilizing, at least in part, a processor of a computing platform;

means for calculating a plurality of range estimates ρ based on a plurality of seed locations x;

means for calculating differences dρ between the plurality of range measurements received at the computing platform and the plurality of range estimates ρ;

means for calculating updates dx for the plurality of seed locations x based on the differences dρ; and means for updating the plurality of seed locations, as x=x+dx.

56. An apparatus comprising:

means for receiving a plurality of range measurements from one or more mobile stations with unknown positions, the plurality of range measurements comprising one or more range measurements to one or more wireless transmitters with unknown positions and one or more range measurements to one or more wireless transmitters with known positions;

means for estimating locations for the one or more mobile stations with unknown positions and locations for the one or more wireless transmitters with unknown positions;

means for calculating a plurality of range estimates based at least in part on a plurality of estimated locations obtained by the means for estimating;

means for calculating differences between the plurality of range estimates and the plurality of range measurements;

means for determining whether the difference between the plurality of range estimates and the plurality of range measurements are less than a specified error threshold; and means for utilizing said estimated locations of the one or more mobile stations with unknown positions and of the one or more wireless transmitters with unknown positions as a plurality of updated seed locations, at least in part in response a determination that the differences between the plurality of range estimates and the plurality of range measurements are less than the specified error threshold.

* * * * *